United States Patent
Norton

(10) Patent No.: US 6,820,896 B1
(45) Date of Patent: Nov. 23, 2004

(54) SEAT OCCUPANT WEIGHT SENSING SYSTEM

(76) Inventor: Peter Norton, P.O. Box 62, Northville, MI (US) 48167

( * ) Notice: Subject to any disclaimer, the term of this patent is extended or adjusted under 35 U.S.C. 154(b) by 76 days.

(21) Appl. No.: 10/104,556

(22) Filed: Mar. 22, 2002

Related U.S. Application Data

(63) Continuation-in-part of application No. 09/495,212, filed on Jan. 31, 2000, now abandoned, which is a continuation-in-part of application No. 09/289,048, filed on Apr. 9, 1999, now Pat. No. 6,364,352, and a continuation-in-part of application No. 09/112,727, filed on Jul. 9, 1998, now Pat. No. 6,259,167, which is a continuation-in-part of application No. 09/081,194, filed on May 19, 1998, now Pat. No. 6,224,094.

(51) Int. Cl.[7] .............................................. B60R 21/32
(52) U.S. Cl. ............. 280/735; 73/862.581; 73/862.584; 177/141
(58) Field of Search ................................. 280/735, 734; 177/141, 208, 209, 254; 73/862.08, 862.322, 862.37, 862.581, 862.584

(56) References Cited

U.S. PATENT DOCUMENTS

| | | | | |
|---|---|---|---|---|
| 2,189,552 A | * | 2/1940 | Raphael | |
| 2,260,401 A | * | 10/1941 | Raphael | |
| 3,078,937 A | * | 2/1963 | Mehki et al. | |
| 4,056,156 A | | 11/1977 | Dayton | |
| 4,201,081 A | * | 5/1980 | Bonomo | 177/208 |
| 6,089,106 A | * | 7/2000 | Patel et al. | 73/862.582 |
| 6,101,436 A | * | 8/2000 | Fortune et al. | 701/45 |
| 6,554,318 B2 | * | 4/2003 | Kohut et al. | 280/801.1 |

\* cited by examiner

*Primary Examiner*—Eric Culbreth

(57) ABSTRACT

A seat occupant weight sensing system includes load cells that receive the weight of a seat occupant. A microprocessor receives indication of force applied to the load cells and may also receive output from a seat belt tension sensor and/or an atmospheric pressure sensor. In a first preferred embodiment four load cells supporting a seat each have a fluid filled chamber, and a pressure sensor in each load cell provides an electric signal indicating the pressure in the fluid. The four signals are added to determine the weight of the seat occupant. In a second preferred embodiment fluid conduits connect the four fluid filled chambers to a common pressure sensor. The load cells comprise two flanged conical springs stressed to provide preload. In the preferred embodiments, a spring is part of the surface of the chamber that confines the fluid. The two springs operate in concert to resist side forces and moments. The load cell is responsive to both compressive and tensile forces while being substantially unaffected by lateral forces and moments tending to cause angular misalignment. The seat belt tension sensor enables distinction between apparent weight caused by force applied by a seat belt to a child seat and the actual weight of a person. A first seat belt tension sensor comprises a switch that closes at a predetermined seat belt tension. A second seat belt tension sensor measures seat belt tension.

22 Claims, 9 Drawing Sheets

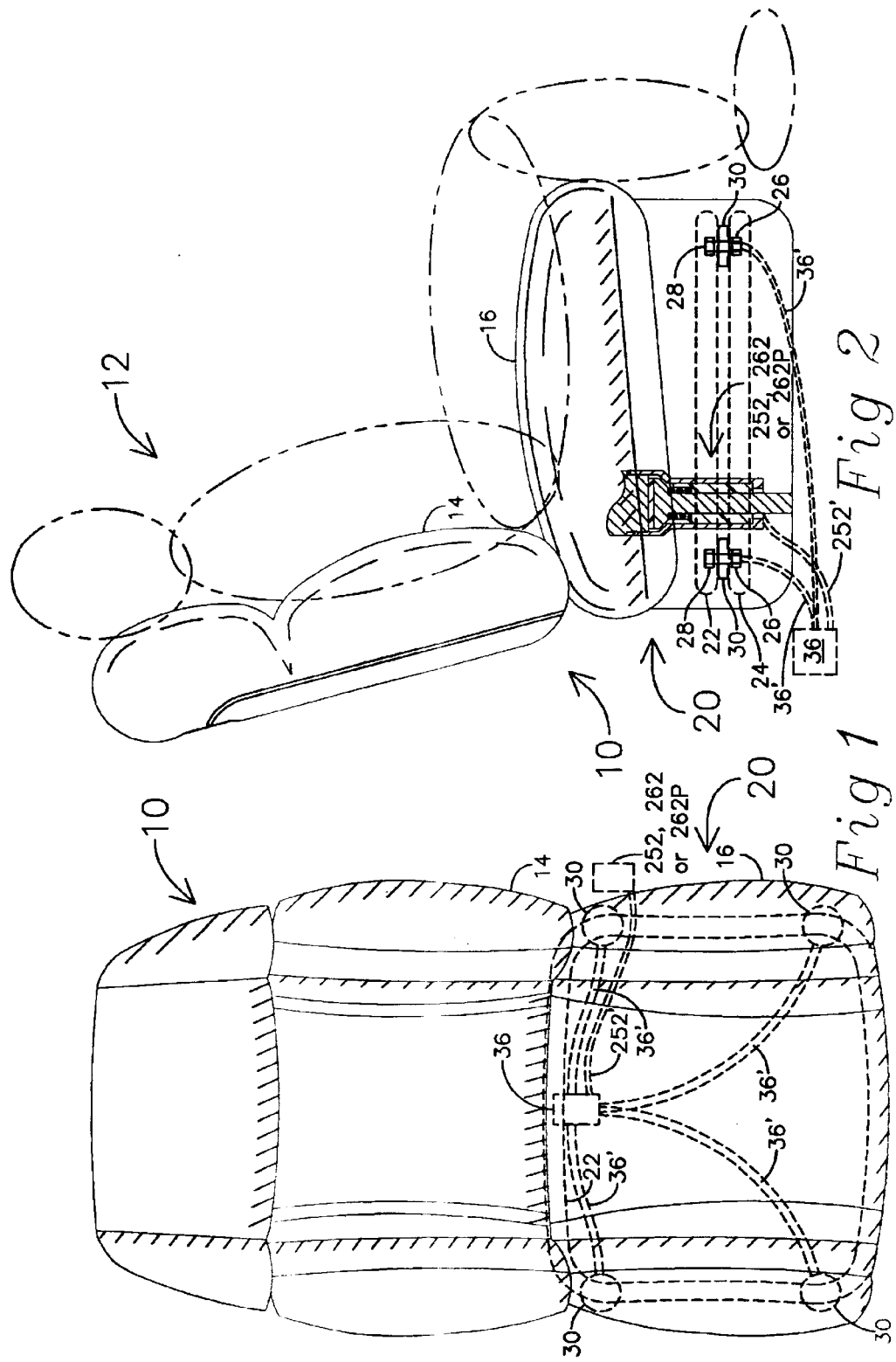

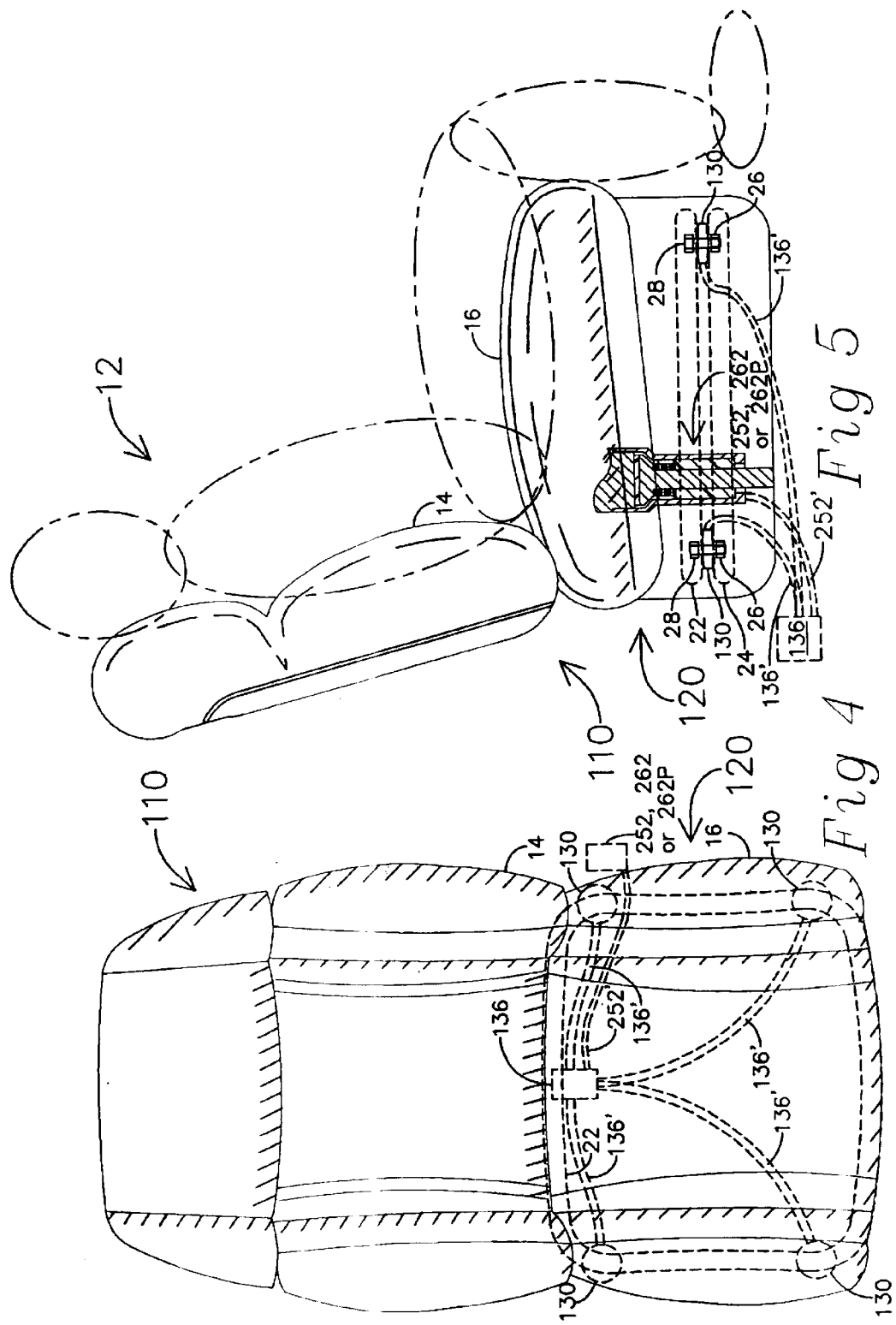

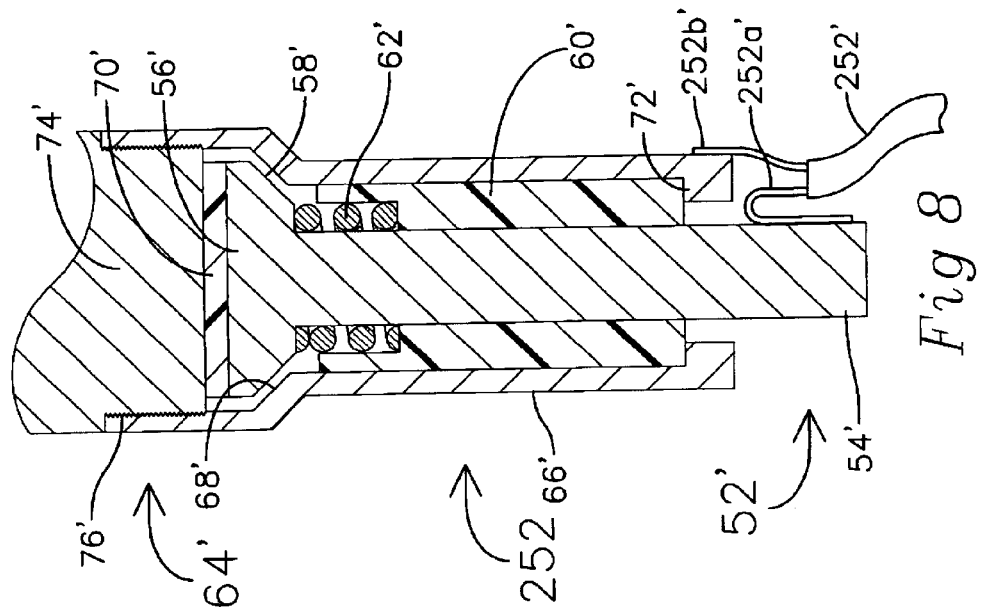
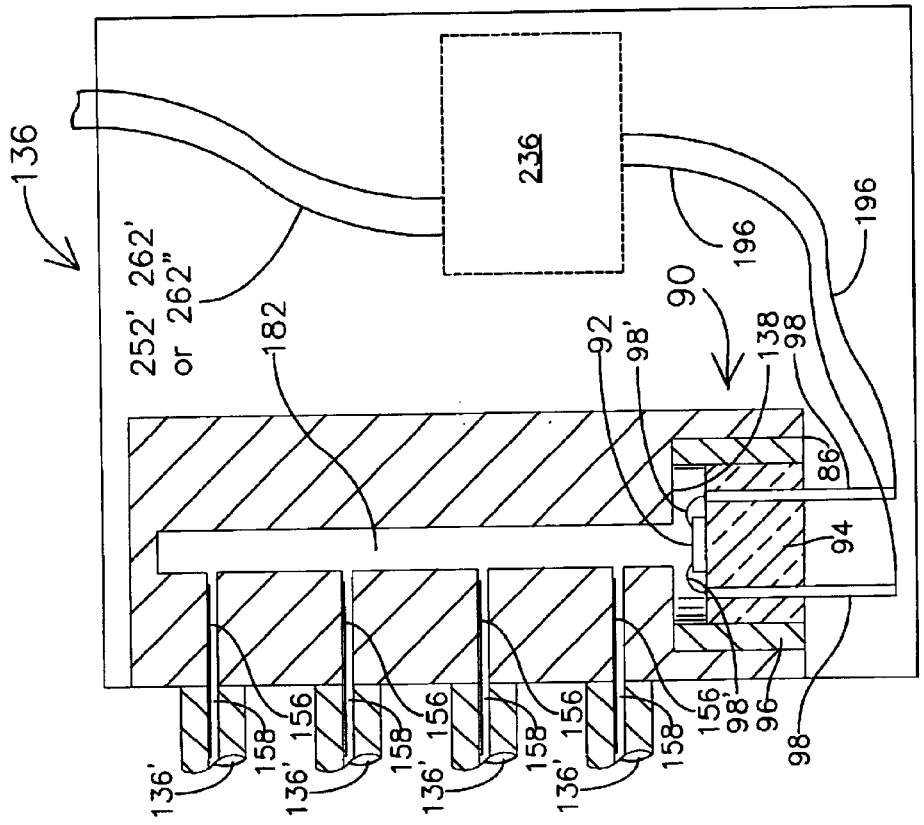
Fig 8
Fig 7

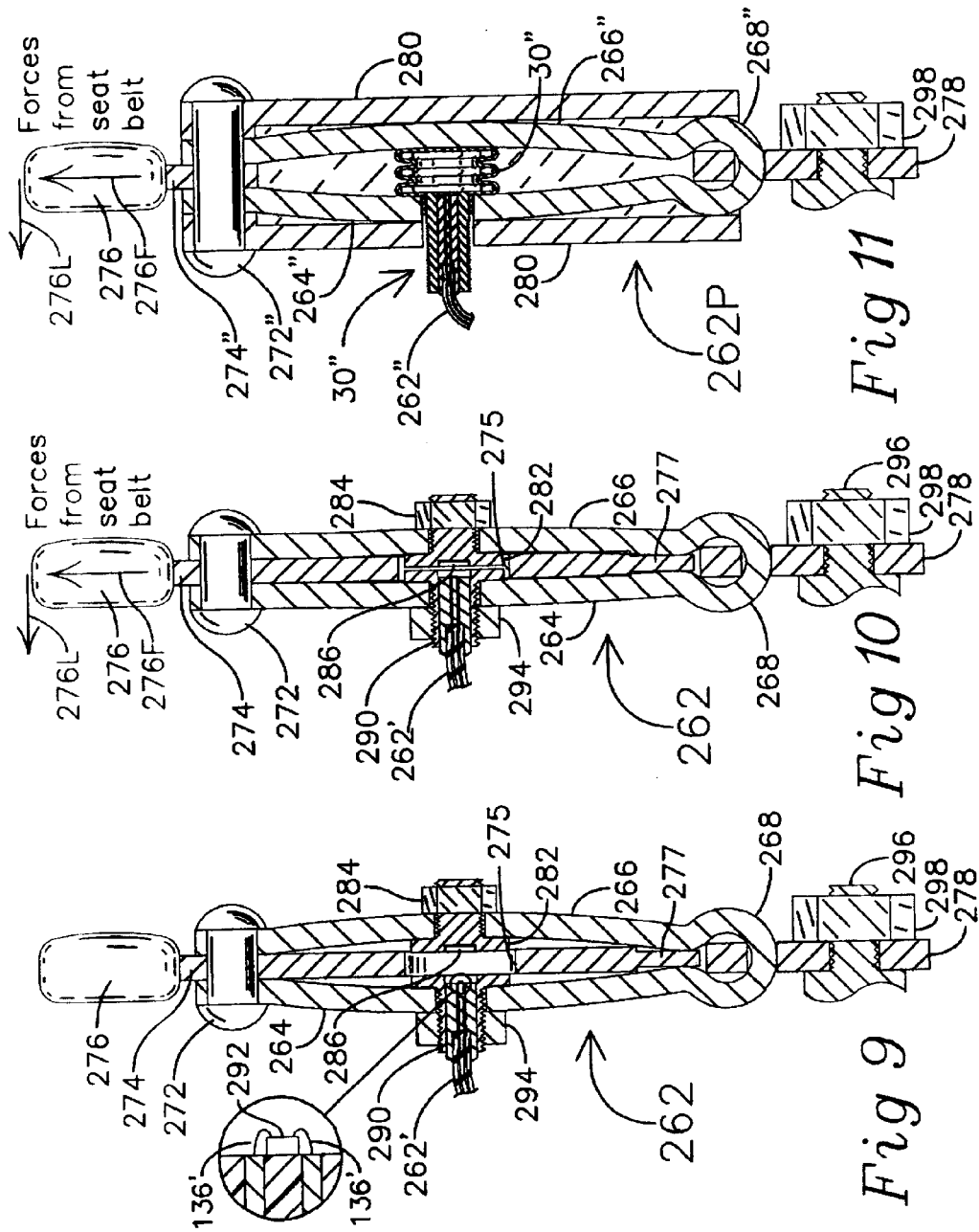

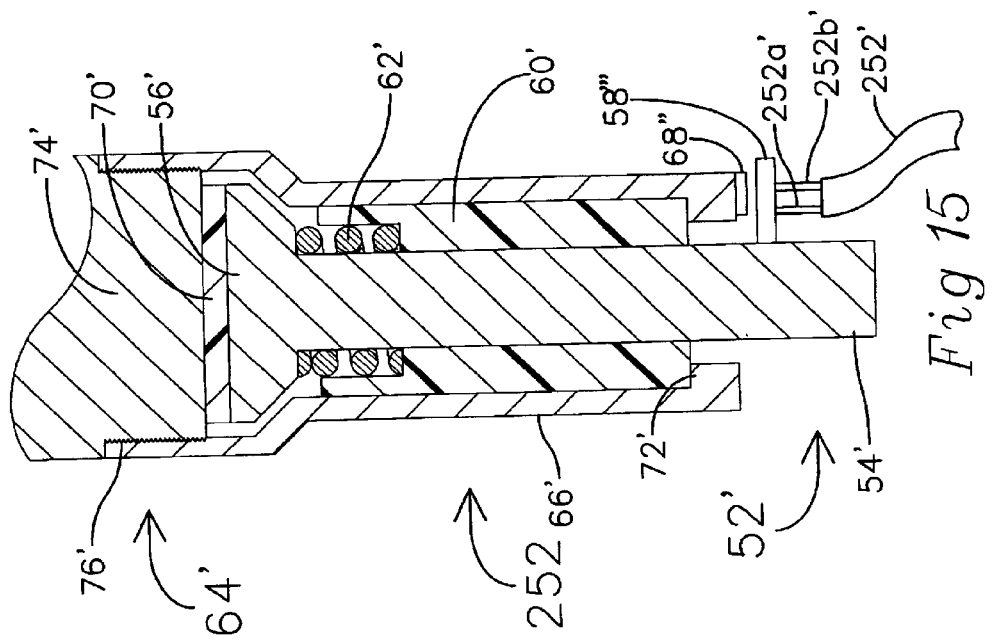
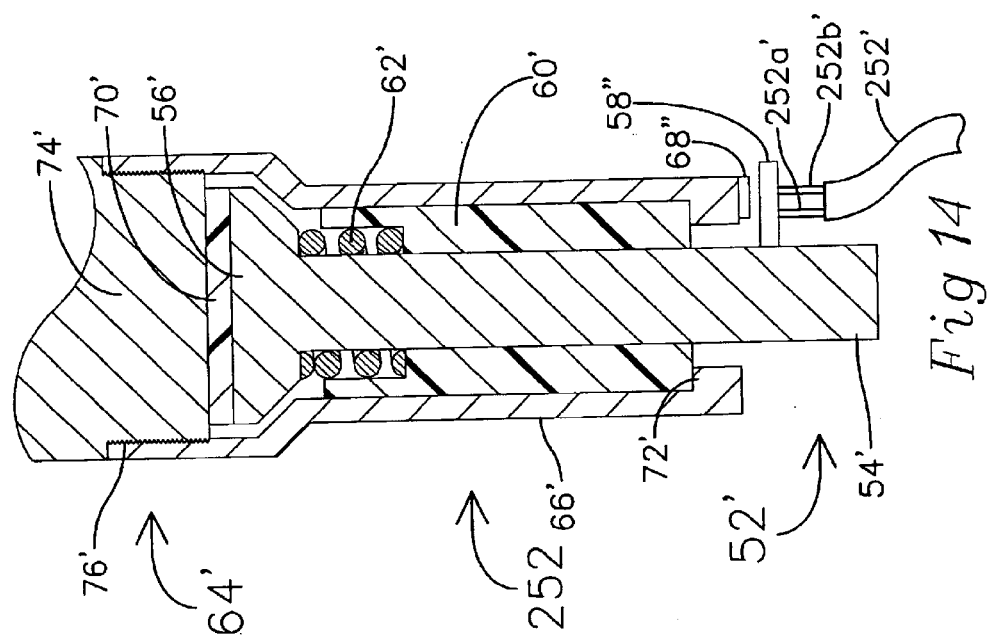

SEAT OCCUPANT WEIGHT SENSING SYSTEM

This is a continuation-in-part of application Ser. No. 09/495,212 filed Jan. 31, 2000 and titled SEAT OCCUPANT WEIGHT SENSING SYSTEM now abandoned which is a continuation-in-part of application Ser. No. 09/289,048 filed Apr. 9, 1999 and titled SEAT OCCUPANT WEIGHT SENSING SYSTEM now U.S. Pat. No. 6,364,352 which is a continuation-in-part of application Ser. No. 09/081,194 filed May 19, 1998 and titled FORCE SENSOR FOR SEAT OCCUPANT WEIGHT SENSOR now issued as U.S. Pat. No. 6,224,094. Application Ser. No. 09/289,048 is also a continuation-in-part of application Ser. No. 09/112,727 filed Jul. 9, 1998 and titled SEAT OCCUPANT WEIGHT SENSING SYSTEM now issued as U.S. Pat. No. 6,259,167.

FIELD OF THE INVENTION

This invention relates to systems that ascertain what is occupying a vehicle seat for the purpose of deciding how to best protect an occupant.

BACKGROUND OF THE INVENTION

Air bags of occupant protection systems are expensive and in certain circumstances are dangerous. It is therefore important to avoid deployment when the seat is empty to save the cost of replacement. It is important to avoid deployment when circumstances do not warrant deployment or when deployment might do more harm than good. It is particularly important to deploy the airbag judiciously when the seat is occupied by a child or by a very small adult. A system is desired to reliably distinguish a 105 pound adult from a child even when the child is in a child seat and belts retaining the child seat are under substantial tension.

Occupant protection systems typically include a "sensor and diagnostic module" or "SDM" which performs various functions related to sensing the severity of a vehicle crash, monitoring various elements of the occupant protection system for proper operation, and initiating deployment of occupant protection means. SDMs typically include a microprocessor, an accelerometer, an arming sensor, circuitry interconnecting the aforementioned components and switches for initiating deployment of the occupant protection devices. SDMs may be connected to receive input from such as side mounted and forward mounted crash sensors.

Knowledge of the weight of a seat occupant is useful. If the weight is very small it may be assumed that the seat is unoccupied or occupied by a small child; in either case airbag deployment would not be desired. If the weight is intermediate, say between 30 and 45 kilograms, then the occupant is likely to be a child and whether or not an airbag should be deployed depends on factors such as how energetically the airbag deploys. If the weight is greater than 45 kilograms the seat occupant is likely to be an adult who would be protected by an airbag.

Three types of weight sensing systems for installation in vehicle seats are known: A first type of weight sensing system comprises an array of force sensors located immediately beneath the upholstery material of the seat cushion which operates to measure the pressure of the occupant against the seat at the points where sensors are located. These sensors are typically responsive to small forces applied over a small area and an array of force sensors tells a microprocessor the magnitude and distribution of the force the occupant applies to the cushion. The microprocessor ascertains the weight and other attributes of the seat occupant from the information provided by the array of force sensors.

The second type of weight sensing system is useful in the type of seat having a seat cushion supported by a platform. The second type of weight sensing system includes, typically, four force sensors located at the four corners of the platform where they can transfer force to the frame of the seat. The outputs of the four sensors are added to ascertain the total weight being supported by the platform and, therefore, by the seat cushion.

The third type of weight sensing system comprises sensors for sensing stress in structural members of the seat. A chair having a load cell at each leg for sensing the weight carried by the leg with an adder for adding the inputs from each load cell would be an example of the third type of weight sensing system. The outputs of the sensors (four load cells in the case of the aforementioned chair) are added and the weight of the empty seat is subtracted to obtain the weight of the occupant.

The known embodiments of the aforementioned weight sensing systems do not always measure the occupant's weight accurately and no design is widely accepted. Certain of the aforementioned weight sensing systems may provide weight readings for a tightly belted child seat that resemble weight readings for an adult.

Load cells comprising a piston sealingly movable in a cylinder to generate hydraulic pressure are well known. At the front of a reclined seat the seat may apply upward force to a load cell which requires a load cell that responds to both tension and compression. To measure tension, a sensor based on a piston sealingly movable in a tube must be preloaded by such as a spring to maintain a pressure in the liquid that diminishes when tension is applied. The output of load cells preloaded by springs may vary with temperature because liquids typically have larger thermal expansion coefficients than metals, which leads to varying spring deflection with temperature and, therefore, varying preload with temperature. A gel is often used as the liquid because it is easier to seal against leakage.

Load cells comprising a piston sealingly movable in a cylinder have friction between the piston and the cylinder when there are side forces. There are many causes for side forces. In a vehicle side forces can be caused by differential thermal expansion between the car floor and the seat, forces caused by attaching the seat to the vehicle, damage to the seat or the car floor and forces resulting from acceleration of the vehicle or actions of the seat occupant. It is important to isolate the piston from angular misalignment between seat parts and car floor parts that occur because of production variations in the parts. A load cell is needed that is inherently insensitive to side forces and angular misalignments.

Seat occupant weight sensing systems responsive to stress in the seat structure must respond only to forces resulting from the weight of the seat occupant and not to stresses resulting from thermal expansion or attachment to the vehicle. An advantage of seat occupant weight sensing systems responsive to stress in the seat structure is that they present a solution to the aforementioned problem of belt forces causing a child to appear to be an adult. Anchoring the seat belts to the seat frame and placing the force sensors between the belt anchors and the vehicle attachment points makes the measured weights independent of belt forces.

It is often desired to place four load cells between the vehicle floor and the seat. There are times when substantial forces can occur between a seat and the vehicle floor. For example, if a structural member of a seat is attached to the floor of a vehicle it can happen that the structural member remains at a temperature comfortable to the vehicle occupants while the vehicle floor goes from a very cold temperature caused by winter conditions to a very high temperature caused by heat rising from a catalytic converter. The result is relative thermal expansion of the floor that can cause substantial horizontal stresses that will be experienced by load cells placed between the floor of a vehicle and the seat.

Semiconductor pressure sensors are manufactured in large quantities by micromachining silicon wafers. Designs are based on various technologies and physical principles. These sensors may require additional components to meet needs for such as temperature compensation. Typically, but not necessarily, a second circuit assists the micromachined pressure sensing element. Certain micromachined sensors operate immersed in the liquid as they sense the pressure of the liquid.

The aforementioned need for temperature compensation and other needs such as compensation for nonlinear pressure response and variable overall span are typically met by including an inexpensive microprocessor or an "application specific integrated circuit" (ASIC), which is a purpose built microprocessor, in close proximity to the pressure sensor.

Load cells of the type that convert force to hydraulic pressure comprising absolute pressure sensors are less expensive than load cells comprising gauge pressure sensors because the micromachined sensors themselves are less expensive and because absolute pressure sensors simplify the design of load cell because it is not necessary to provide a duct from the pressure sensor to the outside atmosphere. The output of a force sensor comprising an absolute pressure sensor responds to changes in atmospheric pressure. Going from sea level to an altitude of 5,300 feet at Denver, Colo. with the same occupant weight can cause indication of three to ten pounds decrease in the force sensed by each load cell.

It is well known to connect a sensor using only two electrical conductors. In typical designs the sensor simultaneously draws power needed to operate and also draws constant or pulsed current over and above the current it requires to operate. The additional current indicates the physical measurement.

Child seats are made in several types. Infant seats are mounted in a rear facing orientation and are typically intended for infants weighing Less Than 18 pounds. Child seats are mounted in a forward facing direction. They are usually intended for children weighing 18 and 40 pounds but some designs may be mounted in a rear facing orientation for use as an infant seat. The aforementioned two types provide their own seat belts and are anchored by the vehicle seat belts which are kept away from the child. The vehicle seat belts may be under substantial tension. The third type of child seat uses the vehicle seat belts to restrain the child and some are designed for children weighing as much as 60 pounds. Operation of the third type with a large belt tension is unlikely because of the discomfort it would cause.

U.S. Pat. No. 6,259,167 issued to the present inventor describes a seat occupant weight sensing system based on torque sensed at the cushion of a seat and two seat occupant weight sensing systems based on torque sensed at the frame of the seat.

U.S. Pat. No. 6,259,167 also discloses a force sensor comprising a liquid filled injection stretch blow molded bottle having bellows shaped sides and a pressure sensor thereby being a force sensor responsive to axial force. The force sensor operates by converting axial force to pressure in the liquid for sensing by the pressure sensor.

U.S. Pat. No. 6,224,094 issued to the present inventor describes a load cell for generating an electric signal indicating applied force. The load cell has a pressure sensor and a means for converting applied force to pressure whereby its output becomes a force signal. The load cell is preloaded by a constant force spring whereby relative thermal expansion between the liquid and the structural parts of the load cell does not cause the pressure in the liquid to vary. The spring also provides a low friction bearing in the axial direction and resists radial movement between two parts of the load cell.

Weight sensing systems comprising a platform and four load cells at the corners of the platform are well known. For example, U.S. Pat. No. 4,056,156 issued to Arnold J. Dayton on Nov. 1, 1977 teaches a bathroom scale having four load cells each having a resilient metal bellows for pressurizing liquid and connected to a common plenum connected to a pressure sensor. These weight sensing systems can be quite sensitive to temperature unless means are provided to accommodate the change of volume of the liquid with temperature. One exception is if the fluid is water at room temperature because water has a very low thermal expansion coefficient between 5° C. and 25° C. For vehicle occupant weight sensing, accurate response is required between −40° C. and +100° C. and for this operating temperature range all known fluids exhibit large thermal expansions relative to metals and most plastics.

Copending application Ser. No. 09/289,048 discloses a force sensor comprising a liquid filled injection stretch blow molded bottle having bellows shaped sides and a pressure sensor in a load cell having a disk spring whereby the load cell is preloaded by the force of the disk spring and the disk spring also operates as a bearing that allows axial movement but resists radial movement.

A general object of this invention is to provide a seat occupant weight sensing system offering low cost and superior performance and also to provide a load cell that is particularly adapted for sensing force derived from the weight of a seat occupant which also overcomes certain disadvantages of the prior art.

SUMMARY OF THE INVENTION

In accordance with the invention, a seat occupant weight sensing system comprises four load cells located in the force path between the seat occupant and the vehicle structure. Each load cell comprises two input members and a pair of springs that operate in concert to isolate force applied in the direction of an axis of the load cell from other forces. This enables a force sensor to respond to the isolated axial force and not respond to the other forces.

Further, in accordance with the invention, the two springs are conical springs under a stress that makes them flat. Cylindrical flanges are provided at the inside diameters and the outside diameters of the springs. The conical springs are affixed to the input members only at the ends of the flanges which substantially eliminates friction when the input members move relative to each other. The conical springs also prevent radial movement between the input members of the load cell.

Further, in accordance with the invention, the two springs resist axial misalignment between the input members. This causes the load cell to compel the normal parallel alignment between the part of the vehicle floor to which the seat attaches and the part of the seat that is attached to the vehicle or between other elements joined by the load cells.

Further, in accordance with the invention, the mounting between the load cell and an element to which the load cell is mounted is adapted to yield in a sideways direction when subjected to a modest side force such as 50 pounds. The yielding limits the side force applied to the load cell to approximately fifty pounds. Limiting the side forces to which the load cell is exposed eases the requirements for insensitivity to side forces relative to a load cell that might have to withstand the substantial side forces which might result from such as relative thermal expansion between two vehicle components between which a load cell is attached.

Further, in accordance with the invention, the load cell comprises means for converting force applied to the input members to pressure in a fluid and a pressure sensor providing an electric signal indicating the hydraulic pressure.

Further, in accordance with the invention, the fluid has a much larger thermal expansion coefficient than the materials of which the other parts of the load cell are made, and the difference in thermal expansion coefficients between the fluid and the other parts is compensated by using designs and materials that provide partial or complete compensation that reduces or eliminates the variation of the output of the load cell with temperature. It advantageously happens that the materials that compensate for differential thermal expansion are also particularly desirable materials for the functions they perform in the load cell.

Further, in accordance with the invention, an input member is attached to a vehicle seat or the vehicle structure by a threaded fastener and isolation means are provided to prevent distortion of the input member by stresses resulting from tightening the threaded fastener from affecting the output of the force sensor.

Further, in accordance with a first embodiment of the invention, a multiplicity of load cells each includes a pressure sensor and each receives some of the weight to be measured. The load cells are connected with a common circuit which adds the outputs of the load cells to calculate the total seat occupant weight.

Further, in accordance with a second embodiment of the invention, a multiplicity of load cells are provided, each having a chamber containing pressurized fluid. The chambers are in fluid communication with a common plenum whereby all the fluid chambers are at the same pressure. A single pressure sensor measures the plenum pressure which indicates the sum of the axial forces applied to the load cells.

Further, in accordance with the aforementioned second embodiment of the invention, inherent temperature compensation of each load cell causes the output of the single pressure sensor to accurately indicate the sum of the axial forces even when different load cells are at different temperatures.

Further, in accordance with the invention, an atmospheric pressure sensor informs the microprocessor of the atmospheric pressure which enables the pressure sensors of the load cells of the invention to be absolute pressure sensors and enables the microprocessor to correct for variations in the outputs of the load cells caused by variations in atmospheric pressure.

Further, in accordance with the invention, a switch responsive to seat belt tension is provided that closes at a predetermined tension that would be uncomfortable to a human and therefore indicates that the seat is being occupied by a tightly belted child seat.

Further, in accordance with the invention, a seat belt tension sensor comprises two bowed bands adapted to straighten when stressed by seat belt tension. A sensor responds to the straightening of the two bands. An extension from the seat belt applies tension to the bands and protects against torques that might tend to unevenly stress the bowed steel bands. A microprocessor uses the tension to calculate the weight of the seat occupant in the presence or absence of substantial seat belt tension.

A complete understanding of this invention may be obtained from the description that follows taken with the accompanying drawings.

DESCRIPTION OF THE DRAWINGS

FIG. 1 shows a perspective view of a vehicle seat with the first embodiment of the seat occupant weight sensing system of the invention with certain components related to weight sensing indicated by dashed lines.

FIG. 2 shows a side view of the seat illustrated in FIG. 1 and including a seat belt tension sensor.

FIG. 4 shows a perspective view of a vehicle seat with the second embodiment of the seat occupant weight sensing system of the invention with certain components related to weight sensing indicated by dashed lines.

FIG. 5 shows a side view of the seat illustrated in FIG. 4 and also shows a seat belt tension sensor.

FIG. 7 shows partially in section the pressure sensor and processing unit of the second embodiment of the invention.

FIG. 8 shows a switch responsive to seat belt tension.

FIG. 9 shows a sensor responsive to seat belt tension comprising a pair of bowed bands and a distance sensor.

FIG. 10 shows the sensor illustrated in FIG. 9 as it appears when seat belt tension is being applied.

FIG. 11 shows a sensor responsive to seat belt tension comprising a pair of bowed bands and a force sensor.

FIG. 14 shows a seat belt tension sensing switch comprising a Hall effect switch responsive to seat belt tension.

FIG. 15 shows a seat belt tension sensing switch comprising a reed switch responsive to seat belt tension.

BEST MODE FOR CARRYING OUT THE INVENTION

Figure 3:
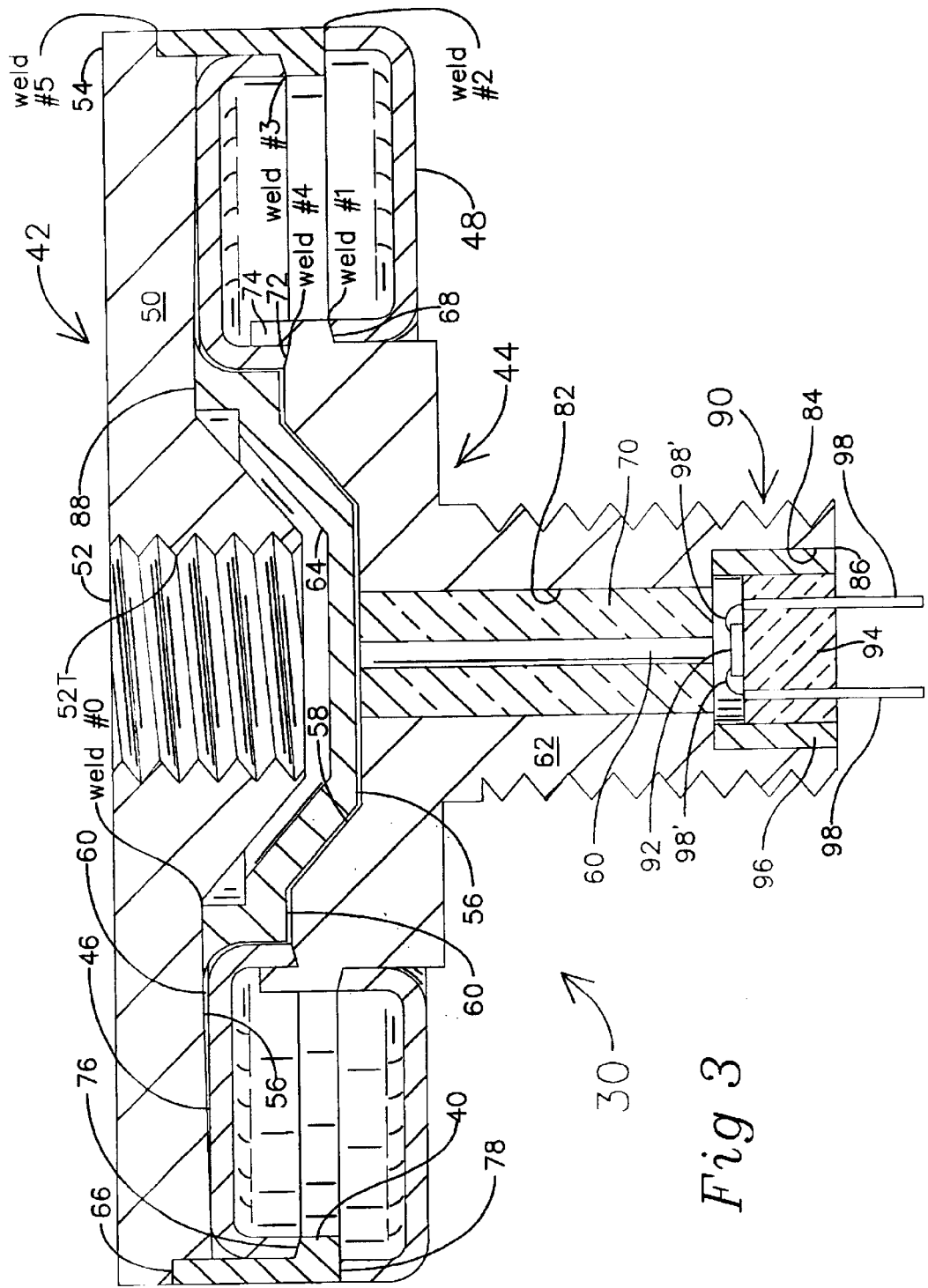
FIG. 3 shows partially in section the load cell of the first embodiment of the invention.

Proceeding first with reference to FIGS. 1 through 3, vehicle seat 10 is equipped with an occupant weight sensing system 20 for weighing the seat occupant. In FIGS. 1 and 2 the occupant weight sensing components are illustrated with dashed lines. Occupant weight sensing system 20 comprises four load cells 30 and processing unit 36 for adding the outputs of the four load cells 30 and generating an electric signal indicating the weight applied to the seat. Occupant weight sensing system 20 may also comprise a seat belt tension sensor. The seat 10 receives weight from the seat occupant through cushion 16 and seat back 14. The weight is transferred to an upper member 22 of the seat frame. The upper frame member 22 applies downward force to the load cells 30 located between the upper frame member 22 and a lower seat frame member 24. Alternately, the load cells 30 may be located between the seat and vehicle floor (not illustrated). The load cells respond to downward force between upper frame member 22 and lower frame member 24 by generating an electric signal. Processing unit 36 may include a microprocessor and may include an atmospheric pressure sensor. Processing unit 36 may be combined with an SDM into one package where it shares a microprocessor with the SDM. The electrical connections between the combined SDM and processing unit 36 and other parts of the vehicle are not illustrated. If processing unit 36 and the SDM are not unitary then an electrical connection (not illustrated) is provided for transmitting information from processing unit 36 to the SDM. It will be appreciated as the description proceeds that the invention may be implemented in different embodiments.

The description of occupant weight sensing system 20 is now continued with reference to FIGS. 1 through 3 and 12 but without, for now, a detailed description of seat belt tension sensing switch 252 or seat belt tension sensors 262 or 262P. Seat occupant weight sensing system 20 including seat belt tension sensing switch 252 or seat belt tension sensors 262 or 262P is described hereinafter.

Seat occupant weight sensing system 20 comprises upper frame member 22 for supporting seat back 14 and seat cushion 16. The upper frame comprising upper frame member 22 may be any design known to be suitable by those skilled in the relevant arts. Any of the known upper frame designs of the type that are attached to a lower frame by four bolts with axes oriented approximately in the vertical direction and located near the corners of the seat cushion are believed to be suitable. Many such designs are in current volume production. The lower frame comprising member 24 may be any lower frame known to be suitable by those skilled in the relevant arts. Any of the lower frames in current production that mate to a suitable current production upper frame member 22 are believed to be suitable. Other materials and manufacturing methods suitable for frame members 22 and 24 may be substituted by those skilled in the relevant arts.

Figure 12:
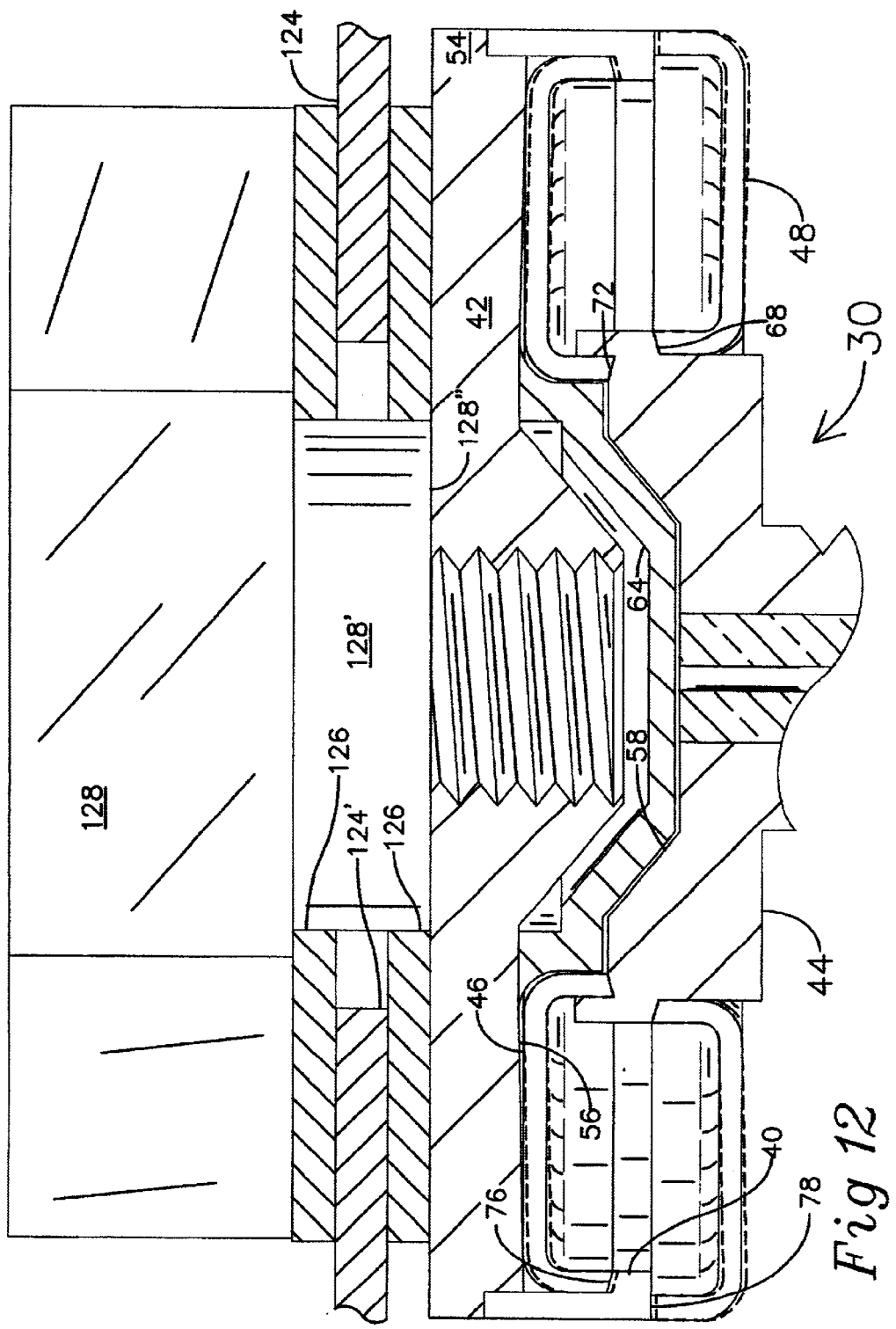
FIG. 12 shows flexing of a spring of the load cells illustrated in FIGS. 1 through 6 and also shows a method of attaching a load cell to a seat.

Alternately, load cell 30 may be attached to a seat frame member 124 as illustrated in FIG. 12 by a shoulder bolt 128 having an unthreaded portion 128' and a shoulder 128". Shoulder bolt 128 sandwiches frame member 124 between two washers 126. Washers 126 are preferably Belleville springs compressed to flatness. A flat Belleville spring provides a predetermined compression force which assures slippage at a predictable side force. Seat frame member 124 has an opening 124' that is substantially larger than the unthreaded portion 128' of shoulder bolt 128 to allow relative movement between seat frame member 124 and shoulder bolt 128 to relieve stresses from relative thermal expansion and contraction.

Each load cell 30 provides an electrical signal through an electrical cable 36' to processing unit 36 indicating the axial force applied to the load cell 30. Each load cell 30 is attached by a threaded nut 26 to lower frame member 24 and by a bolt 28 to upper frame member 22.

Load cells 30 may be located at any other location known to be suitable by those skilled in the relevant arts. In particular, it is desirable for certain vehicles and seat designs to place load cells 30 between the seat and the vehicle floor where the seat would be bolted to the vehicle floor if load cells 30 were absent.

Proceeding now with particular reference to FIG. 3, load cell 30 comprises sleeve 40, top 42, base 44, upper spring 46, lower spring 48, tube 70 and pressure sensor assembly 90. Load cell 30 is filled with liquid 60.

Sleeve 40 is a tubular element comprising surfaces 66, 76, and 78 for welding to the underside of flange 54 of top 42, the outer flange of spring 46, and the outer flange of spring 48 respectively. Surface 76 is angled at 15 degrees to provide access to a laser welder beam. For friction welding, a zero degree angle is preferred. The material of which sleeve 40 is made affects the variation of the response of load cell 30 with temperature. The variation of the output of load cell 30 with temperature depends on the thermal expansion coefficient of the metals used for sleeve 40, top 42, base 44, and springs 46 and 48; and the amount and the thermal expansion coefficient of the liquid 60. If sleeve 40 is made of a material having a larger thermal expansion coefficient than the other parts, it partially or totally compensates for the relatively large thermal expansion coefficient of liquid 60. A suitable material for sleeve 40 is carbon steel for no temperature compensation or type 304 stainless steel to provide temperature compensation. Sleeve 40 is preferably made on an automatic lathe from tube stock. Sleeve 40 has an inside diameter sufficiently larger than the outside diameter of spring 46 to assure there will be clearance at the lowest operating temperatures. Other materials and manufacturing processes for sleeve 40 may be substituted by those skilled in the relevant arts.

Top 42 of load cell 30 comprises an upper portion 50 having a threaded opening 52 and flange 54. Top 42 also comprises cover 64. Threaded opening 52 is adapted for receiving a bolt such as bolt 28 illustrated in FIG. 2 or shoulder bolt 128 illustrated in FIG. 12. The underside of flange 54 is adapted for attachment by welding to surface 66 of sleeve 40. Surface 88 of cover 64 is attached, preferably by friction welding or by laser welding to upper portion 50. Cover 64 is preferably made by cold forging. Making cover 64 of a separate piece of metal provides two advantages: 1) It physically separates the threaded portion of top 42 from the surface in contact with liquid 60 to minimize the sensitivity of load cell 30 to the tightness of the attaching bolt. 2) It reduces manufacturing cost by enabling the remainder of top 42 to have the simple shape of a washer that can be made from sheet steel by a process like fine blanking. The greater thickness of upper portion 50 at threaded opening 52 is inexpensively achieved by piercing the hole for threads 52T, which forces the metal from the hole to form the thickened portion near threaded opening 52. To achieve good strength with minimum weight a high strength low alloy steel is preferred for top 42. Lower surface 56 is the upper boundary of the volume confining liquid 60. It is shaped to closely match the shape of the combination of the top of spring 46 and surface 58 of base 62. Lower surface 56 is finished to its final shape after cover 64 is welded at surface 88 to upper portion 50 as described hereinafter in the description of the manufacturing process. Other materials and manufacturing processes for top 42 may be substituted by those skilled in the relevant arts.

Base 44 of load cell 30 comprises a threaded stud 62, surface 68 for attachment by welding to the inner flange of spring 48 and surface 72 for welding to the inner flange of spring 46. Except for the threads, base 44 is axially symmetric about an axis through the center of the threaded portion. Surfaces 68 and 72 of base 44 are angled at eighty five degrees from the axis to provide access to a laser beam for welding. If friction welding is used, surface 68 and 72 would, preferably, be perpendicular to the axis. Extension 74 of base 44 assists in positioning spring 46 during welding. Base 44 also comprises surface 58 which is in close proximity to part of surface 56 of top 42. The space between surface 56 of top 42 and the combination of surface 58 and the top surface of spring 46 is filled with liquid 60. Threaded stud 62 comprises a cylindrical opening 82 having an enlarged end 84 sized to sealingly mate with pressure sensor assembly 90. Sealing between enlarged end 84 and pressure sensor assembly 90 is preferably assured by laser beam weld 86. Base 44 is preferably made of the same material as top 42. Base 44 is preferably made by cold forming in a conventional bolt making machine. This process comprises 1) Inserting a cylindrical slug in the machine, 2) if necessary, a reduced diameter portion is extruded to form the beginning of threaded portion 82, 3) a cold heading impact forms the remainder (excluding the threaded portion) into the desired shape, 4) the central passage 82 is formed by piercing or drilling, 5) the threads are formed by rolling with a form in central passage 82 sized to the inside diameter of passage 82 and enlarged portion 84. Other materials and manufacturing methods for base 44 may be substituted by those skilled in the relevant arts.

Springs 46 and 48 are preferably formed from spring steel sheet. Spring materials that can be joined by welding to the steels of which sleeve 40, top 42 and base 44 are made may be used. Preferred spring materials are 17-7 precipitation hardened stainless steel and tempered 6150 spring steel. The springs 46 and 48 are preferably formed from annealed spring material and then tempered. The temper is selected in concert with the spring dimensions to meet the performance requirements. Typical requirements are that the springs not yield at stresses lower than 1000 pounds and not fracture at stresses lower than 4000 pounds. For laser welding, the ends of the flanges of springs 46 and 48 may be ground prior to welding to enhance the quality of the weld.

Surface 56 of top 42 is shaped and positioned to be in very close proximity to the top of spring 46 and surface 58 of base 44 over the entire surface 56 before preload is applied and load cell 30 is filled with liquid 60. This is done to minimize the amount of liquid 60 which minimizes the effect of temperature on the signal produced by load cell 30.

Liquid 60 may be any of the fluids known to be compatible with the materials of which load cell 30 is made including micromachined pressure sensor 92. A preferred fluid is one of the silicon based liquids designated DC200 fluids by Dow Corning of Midland, Mich. A 200 centipoise formulation has been used with good results. Ethylene glycol offers the advantage of a smaller thermal expansion coefficient and is believed to be suitable.

Tube 70 fills most of the space inside cylindrical opening 82 which minimizes the amount of liquid 60 required. Tube 70 provides a passage through which the pressure of liquid 60 is communicated to pressure sensor 92. Tube 70 may be made of any material that is chemically compatible with liquid 60 and the other parts of load cell 30. Preferably, tube 70 is made of a glass having a smaller thermal expansion coefficient than the metal parts whereby it operates to reduce or eliminate the dependence of the load cell output on temperature. A glass having a small thermal expansion coefficient such as "Pyrex" glass trademarked by Corning Glass is preferred. Pyrex glass is believed to have the lowest thermal expansion coefficient of the glasses available at low cost.

Pressure sensor assembly 90 comprises micromachined pressure sensor 92 mounted on the glass core 94 of a header assembly which comprises glass core 94 inside a metallic sleeve 96 and feedthrough pins 98 which extend from inside load cell 30 to outside load cell 30. Pins 98 are electrically insulated from the metallic sleeve by glass core 94. Pressure sensor 92 is connected to pins 98 by gold wires 98' bonded to the inside ends of pins 98 and to bonding pads on the micromachined pressure sensor 92. Complete pressure sensor assemblies suitable for pressure sensor assembly 90 are commercially available from IC Sensors of Milpitas, Calif. and others.

Any combination of metals found to be suitable by those skilled in the relevant arts may be used for the parts of load cell 30. The materials may be chosen to minimize the effect of temperature on the output of load cell 30. For example, the following was calculated: in a load cell having an outside diameter of about two inches and wherein springs 46 and 48 were stressed to provide a preload of about 100 pounds and the load cell was filled with Dow Coring DC200 fluid, viscosity 200 centipoise, a sleeve 40 and top 42 made of 304 work hardened steel was found to minimize the effect of temperature when the other parts of load cell 30 were made of type 17-7 stainless steel precipitation hardened to condition TH1050. The following second example was also calculated: in a load cell having the aforementioned outside diameter and preload and filled with the aforementioned fluid a sleeve 40 made of 304 stainless steel in combination with a Pyrex tube 70 was found to minimize the effect of temperature when the top 42 and base 44 of load cell 30 were made of medium carbon work hardened steel and the springs 46 and 48 were made of spring steel.

Any of the known finite element computer codes capable of modeling the operation of load cell 30 may be used to test different combinations of metals and liquid to determine a combination of materials and dimensions that provide a desired compensation for the effects of temperature on performance. The metals may be selected to minimize the change of pressure with temperature or the metals may be selected so that the pressure change with temperature compensates for variation in the response of micromachined pressure sensor 92 with temperature. Other combinations of materials may be substituted by those skilled in the relevant arts to achieve other desired performances.

A method of manufacturing load cell 30 will now be described with particular reference to FIG. 3. In preparation for manufacture, sleeve 40, top 42, base 44, and springs 46 and 48 are made as described hereinabove. Hereinabove it was stated that cover 64 was joined at surface 88 to the remainder of top 42. This is preferably accomplished by placing the upper portion 50 of top 42 in the chuck of a friction welding machine of the type having a crossbar tool holder and friction welding the cover 64 to the upper portion 50. After welding, the surface 56 of top 42 is machined by a lathe tool, as described hereinafter. The surface 56 is machined after welding together of the sleeve 40, base 44 and springs 46 and 48 is complete and the exact profile of the surfaces opposing surface 56 is measured.

The first step in the manufacturing process is to join a base 44 and a spring 48 by weld #1 called out in FIG. 3. If the parts are to be laser welded they are placed in a fixture that holds the inner flange of spring 48 in contact with surface 68 of base 44 and the laser beam is applied. If the parts are to be friction welded then, in a friction welding machine, spring 48 and base 44 are brought together with one of them rotating rapidly until a weld is formed.

The second manufacturing step is to join surface 78 of sleeve 40 to the outer flange of the spring 48 welded in the previous step (weld #2 called out in FIG. 3). If the parts are to be laser welded, then weld #3 must be made before weld #2. If laser welding, sleeve 40 and spring 46 are placed in a fixture that keeps surface 76 of sleeve 40 against the outer flange of spring 46 and a laser beam is applied (weld #3 called out in FIG. 3) as the parts are rotated in the fixture. To perform weld #2 (continuing to assume laser welding) the subassembly of sleeve 40 and spring 46 and the subassembly of base 44 and spring 48 are placed in a fixture that holds the outer flange of spring 48 in contact with surface 78 of sleeve 40 and the laser beam is applied while the parts are rotated.

If the parts are to be friction welded then, in a friction welding machine, the outer flange of spring 48 and surface 78 of sleeve 40 are brought together to form a weld. The friction welding machine should be of the type having the ability to accurately measure the relative axial position of the parts being welded. During the friction welding process the rotation and axial movement is programmed to be brought to a stop when the axial position of surface 76 of sleeve 40 is the same as the axial position of surface 72 of base 44. This results in correct positioning of the surfaces 72 and 76 for the third manufacturing step.

The third manufacturing step is different if laser welding is being used than if friction welding is being used. If laser welding is being used, the third manufacturing step is to weld the inner flange of spring 46 to surface 72 of base 44. The assembly is placed in a fixture that holds the inner flange of spring 46 in contact with surface 72 of base 44. The laser beam is applied to the two surfaces in contact while the fixture rotates to make weld #4.

If the parts are to be friction welded then, in a friction welding machine, spring 46 is brought to the assembly of sleeve 40, base 44 and spring 48 to form a weld. During spin welding, both spring 46 and the combination of sleeve 40, base 44, and spring 48 must be supported so that both springs are in their relaxed state (i.e. not stressed) during welding. During friction welding substantial torque is applied. Therefore, provision must be made for applying large torque to spring 46. This may be done by any means known to those skilled in the design of spin welding fixtures. One preferred fixture design is to provide two or more indentations in the flat surface of spring 46 for engagement by protrusions of the friction welding fixture when applying torque. Spin welding will create some upset material at weld #4 which is preferably removed in the friction welding machine by using a lathe type of cutting tool to cut upset material from the inside diameter of spring 46 and surface 58 before it has had time to cool and fully harden. During friction welding the axial positions of the assembly and spring 46 are accurately monitored and rotation and axial movement are programmed to stop so that spring 46 is accurately located relative to base 44.

The fourth manufacturing step is to finish surface 56 of top 42. After the assembly comprising sleeve 40, base 44, and springs 46 and 48 is complete and while it is slowly rotating its upper surface comprising the upper surface of base 44 and the upper surface of spring 46 is probed at a sufficient number of radii that its profile is known. Top 42 remains in the friction welding machine after cover 64 was welded to the upper portion 50. While still in the friction welding machine a lathe cutting tool is applied to surface 56 of top 42. Surface 56 is turned to match the profile determined by probing the upper surface 58 of base 44 and the upper surface of spring 46. This cutting process corrects any variations from the process of welding cover 64 to upper portion 50 and produces a surface matching the measured profile of the top of spring 46 and the top surface 58 of base 44.

The fifth manufacturing step is to join flange 54 of top 42 to surface 66 of sleeve 40 of the assembly of sleeve 40, base 44, spring 46, and spring 48. To achieve consistent performance, the space between surface 56 and the area formed by the top of spring 46 and surface 58 of base 44 must be consistent from part to part. This is achieved by designing the welding process so that the surfaces are very close or in contact when welding is complete. The gap illustrate in FIG. 3 where liquid 60 resides, largely results from preloading springs 46 and 48 which separates the aforementioned surfaces and provides a volume to contain liquid 60.

If weld #5 is to be a laser weld, the parts are placed in a fixture that holds the lower surface of flange 54 and surface 66 of sleeve 40 in contact. For laser welding, the aforementioned turning of surface 56 is done such that there is a small gap such as 0.02 mm between surface 56 and the surface comprising the tops of base 44 and spring 46. The laser beam is then applied to form the weld.

If weld #5 is to be a friction weld, then, with top 42 in the spin welding machine, the assembly of sleeve 40, base 44 and springs 46 and 48 is brought to the top and a weld is formed. The welding is programmed so that after welding is complete and the heated material has cooled, surface 56 and the tops of base 44 and spring 46 are a predetermined distance such as the aforementioned 0.02 millimeters from each other. Friction welding heats sleeve 40 near surface 66 and the lower surface of flange 54. After welding the heated regions will contract which brings surface S5 and the tops of base 44 and spring 46 toward each other. During friction welding the bringing together of the assembly and top 42 are carefully controlled to achieve a final position such that contraction upon cooling terminates with the surface 56 and the top of spring 46 and surface 58 at the desired separation.

The sixth step of manufacture fills the sensor with fluid and corks the opening with pressure sensor assembly 90. In the sixth step, the predetermined preload is applied between top 42 and base 44 which stresses springs 46 and 48 and opens a space between surfaces 56 and 58 as illustrated in FIG. 3. A typical preload would be a force in the range of fifty to one hundred pounds. The welded housing of load cell 30 with preload force applied is placed in a vacuum until substantially all air is exhausted. The liquid 60 is then injected through tube 70 at a high pressure such as 200 psi to insure that all voids are filled. Pressure sensor assembly 90 is pressed into place to form an interference fit. A sealant may be applied to the outside diameter of pressure sensor 90 to assure a tight seal. Loctite Corporation supplies a number of sealants for sealing interference fits. A particular sealant that worked in one application is Loctite type 609 sealant. A weld 86 around the circumferential contact between pressure sensor assembly 90 and the end of stud 62 using such as a resistance welder or laser welder may be applied to further assure a hermetic seal. Any other welding or sealing method known to those skilled in the welding or sealing arts to be suitable for sealing the opening of load cell 30 may be substituted for the methods described hereinabove.

The load cell 30 is weighed before and after it is filled with fluid. The difference in weight is the weight of the fluid added. Compensation for temperature proportional to the weight of fluid added is required. Some temperature compensation may be provided by the choice of materials, which does not change with the amount of fluid added. Therefore, the load cell requires, to a first approximation, temperature compensation equal to a compensation proportional to the amount of fluid added less a constant that is determined by the materials used and the dimensions of load cell 30. Pressure sensor 90 is preferably of the type having a controllable temperature compensation that can be set by electrical signals applied to the pressure sensor. As a last step in the manufacture of load cell 30 the required temperature compensation is set into pressure sensor 90 or an associated ASIC.

The materials, methods, and designs referred to hereinabove are only suggestions and other materials, methods and designs may be substituted by those skilled in the relevant arts.

The operation of the seat occupant weight sensing system 20 of the invention will now be described with reference to FIGS. 1 through 3. In operation of the system, when seated occupant 12 applies downward force to seat cushion 16 and seat back 14 the force is transmitted to an upper frame which comprises upper frame member 22. Upper frame member 22 applies the downward force to the four load cells 30. Load cells 30 each transmit a signal through an electrical cable 36' to processing unit 36 indicating the applied force. If load cells 30 comprise absolute pressure sensors and processing unit 36 contains an atmospheric pressure sensor the microprocessor of processing unit 36 subtracts the atmospheric pressure from the pressure inside each load cell 30 and multiplies the difference by a characteristic area of each load cell 30 to compute the downward component of the force being applied to each load cell 30 plus the preload force. The microprocessor of processing unit 36 subtracts from the force registered for each load cell the force registered at a previous time for that load cell when the seat was empty. The sum of the four differences thus computed is the weight of the occupant of seat 10. Processing unit 36 may combine the information from load cell 30 with other information, such as seat belt tension, to further characterize the seat occupant and more accurately ascertain the weight of the seat occupant.

The operation of load cell 30 will now be described with particular reference to FIGS. 3 and 12. When a force is applied to top 42 of load cell 30 in the direction of the axis of rotational symmetry of load cell 30, that force is applied to liquid 60 over the area of surface 56 which increases the pressure in liquid 60 by an amount equal to the applied force divided by the area of surface 56. The pressure is sensed by pressure sensor 92 which generates an electric signal which is transmitted through conductors 98' and 98 to the outside of load cell 30. The electric signal is transmitted through electrical cable 36' to processing unit 36. When downward force is applied to load cell 30 there is a slight compression of the liquid 60 and a slight flexing of springs 46 and 48 with a slight downward movement of top 42 relative to base 44. This movement is very small because liquid 60 is substantially incompressible and because the amount of liquid 60 is small.

Figure 6:
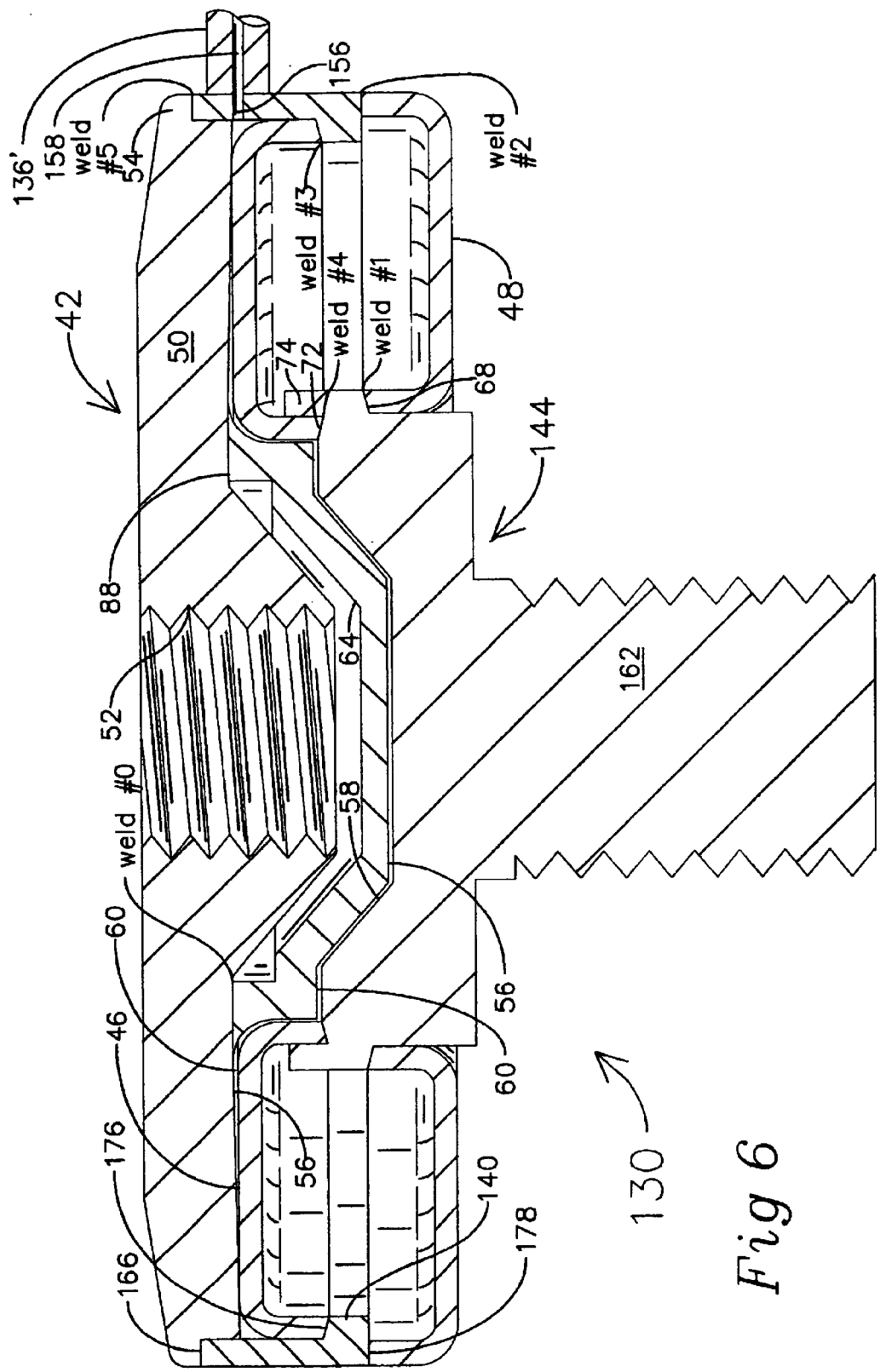
FIG. 6 shows partially in section a load cell of the second embodiment of the invention.

The flexing of the springs 46 and 48 of FIGS. 3 and 6 is illustrated in FIG. 12. In FIG. 12 the stressed shapes of springs 46 and 48 in which spring 46 and 48 are providing preload are illustrated with solid lines and the unstressed shapes are illustrated with dashed lines. The stressed shapes are the shapes illustrated in FIGS. 3 and 6. In FIG. 12 the springs 46 and 48 and sleeve 40 are not hatched for clarity. The reader may refer to FIGS. 3 and 6 for appropriate hatching. In FIG. 12 it will be seen that the outer circumferences of the unstressed (shown with dashed lines) springs 46 and 48 are below by a small amount the corresponding parts of the stressed springs. A shifted top 42 is not illustrated in order to increase the clarity of FIG. 12. It can be seen that if top 42 were shifted downward by the aforementioned small amount, surface 56 and surface 58 would be in contact and there would be no space between them for fluid 60. The space between surface 56 and the combination of the top of spring 46 and surface 58 for fluid 60 results from the stress caused by preloading. It can also be seen that the lower washer shaped surface of the unstressed lower spring 48 and the upper washer shaped surface of the unstressed upper spring 46 are slightly conical. The amount of the cone is determined so that the two aforementioned washer surfaces of springs 46 and 48 are flat when they are stressed in the condition illustrated in FIGS. 3 and 6. It is believed that designing springs 46 and 48 so that their washer shaped surfaces are flat in operation provides the maximum insensitivity to moments and side forces.

The operation of the seat occupant weight sensing system of the invention will now be described with particular reference to FIGS. 3 and 12. When shoulder bolt 128 is tightened, compression forces are applied to the region of top 42 surrounding threads 52T, which slightly compresses the metal surrounding threads 52T and draws it in toward the threaded part of bolt 128. The physical separation between cover 64 and the metal surrounding threads 52T prevents the lower surface 56 from being drawn upward by the tightening of bolt 128 and affecting the output of a force sensor responsive to the position of surface 56. When the lower surface surrounding threaded opening 52 is drawn upward, the lower surface 56 remains unmoved, which enables the output of the force sensor to be unaffected.

Continuing with particular reference to FIGS. 3 and 12, when a force is applied to load cell 30 perpendicular to the axis of rotation of load cell 30 this force is resisted by springs 46 and 48. Springs 46 and 48 operate to maintain the axes of top 42 and base 44 in alignment in the presence of both side forces and moments. Side forces and moments do not change the relative axial position between top 42 and base 44 so the pressure in liquid 60 is, to a first order approximation, not changed. In fact, side forces and moments cause slight distortions in spring 46 and even smaller distortions in top 42 and base 44. These slight distortions cause small changes in the pressure in liquid 60. These small changes were found, in one design, to cause Less Than one percent of the pressure change similar forces would cause in liquid 60 if applied in the axial direction.

Continuing with particular reference to FIGS. 3, 6, and 12, when relative thermal expansion or other effects operate to exert a substantial side force such as 100 pounds between seat frame member 124 and load cell 30 or 130, seat frame member 124 slips between washers 126. Washers 126 are prevented from moving perpendicular to load cell 30 or 130 by the engagement between the inside diameters of washers 126 and unthreaded portion 128' of shoulder bolt 128. There is sufficient force between washers 126 and seat frame member 124 that smaller sideways forces do not cause slippage. This operates to minimize the effects of side forces on the output of load cell 30 or 130 by limiting side forces to values that cause slippage between seat frame member 124 and washers 126. This operates to limit the effect of forces resulting from such as differential thermal expansion between two vehicle components to which a load cell 30 or 130 is attached.

The effect of temperature changes will now be described with particular reference to FIG. 3. FIG. 3 illustrates a small gap filled with liquid 60. Over the range of operating temperatures from −40° C. to +100° C. the thermal expansion of the liquid will cause the volume of the liquid 60 to change from a low value to a high value that is eight to fourteen percent larger than the low value depending on the liquid used. For an unrealistic example, suppose that the sleeve 40, top 42, base 44 springs 46 and 48, and tube 70 of load cell 30 are made of the same material such as tempered 6150 spring steel or phase hardened 17-7 stainless steel. Because all the materials have the same thermal expansion coefficient, there is no differential thermal expansion and the metal confining liquid 60 will try to keep the volume substantially constant when the temperature changes (the volume expansion of the metal will be only a few percent of the volume expansion of the fluid) and the increase in the volume of liquid 60 will cause top 42 to move farther from base 44. The movement will further strain springs 46 and 48 which will increase the pressure in liquid 60. The increase in spring force will be proportional to the deflection of the springs. If the miscellaneous volumes such as the volume of the center channel of tube 70, and volume around pressure sensor 92 are small relative to the volume adjacent surface 56, then the pressure in liquid 60 will be proportional to the volume of liquid 60 and will increase about eight to fourteen percent as the temperature goes from the aforementioned low value to the aforementioned high value. Thus, there will be a change in pressure due to temperature of about eight to fourteen percent of the pressure caused by the preload force. For example, if the preload force is one hundred pounds, the change in indicated force over the aforementioned range of temperatures might be fourteen pounds.

In a second example, if sleeve 40 is made of type 304 stainless steel, tube 70 is made of Pyrex glass, and the other aforementioned parts are, as in the previous example, made of material such as tempered 6150 spring steel or phase hardened 17-7 stainless steel, then the variation of the output with temperature will be reduced. Further, there will be approximately zero variation of pressure with temperature at a predetermined spring preload. This is explained in the following. The thermal expansion coefficient of 304 stainless steel is about 10.0 parts per million per degree F. The thermal expansion coefficient of the other metal parts is about 6 parts per million per degree F. This causes sleeve 40 to expand or contract much more during temperature changes than the other parts.

In this case there are the following three effects of a temperature increase:

1. During a temperature increase sleeve 40 will expand more in the radial direction than top 42 and the outer flange of spring 46 which opens space for liquid 60 between sleeve 40 and top 42 and the outer diameter of spring 46. In a design having an outside diameter of about two inches this factor increased the volume available to the fluid by about 0.001 cubic inch over the aforementioned temperature range.

2. During a temperature increase, the height of sleeve 40 will increase more than the height of the outer flange of spring 46. This opens the gap between the top of spring 46 and surface 56 by the amount of the differential expansion. In the aforementioned design having an outside diameter of about two inches this factor increased the volume available to the fluid by about 0.0006 cubic inch over the aforementioned temperature range.

3. During a temperature increase, the volume inside cylindrical opening 82 of base 44 will increase more than the volume of the tube 70. This opens the space around tube 70 into which liquid 60 can flow.

The three above recited effects all operate in concert to increase the space available for liquid 60 at higher temperatures. At a predetermined volume of liquid 60 which corresponds to a predetermined preload (noting that the volume is near zero without preload) the additional volume provided by these effects of temperature change allow liquid 60 to expand without further stressing springs 46 and 48. At this predetermined volume of liquid 60, the pressure in load cell 30 does not change with temperature. For the aforementioned design having an outside diameter of about two inches the two factors 1) and 2) increased the volume available to the fluid by about the amount the volume of the fluid increased over the aforementioned temperature range for a preload of about one hundred pounds. This was the desired preload for that sensor and the two effects made the variation of the output of that sensor with temperature be approximately zero.

Changing the materials and dimensions such as the dimensions of the springs 46 and 48 and the top, and the height and inside diameter of the sleeve 40 change the preload at which constant output over temperature is achieved.

Proceeding now with reference to FIGS. 4 through 7, vehicle seat 110 is equipped with an occupant weight sensing system 120 for weighing the seat occupant. In FIGS. 4 and 5 the occupant weight sensing components are illustrated with dashed lines. Occupant weight sensing system 120 is different from occupant weight sensing 20 in that pressurized fluid rather than an electric signal is transmitted from the load cells to the processing unit Occupant weight sensing system 120 comprises four load cells 130 and processing unit 136 for combining outputs of the four load cells 130 and generating an electric signal indicating the weight applied to the seat. Occupant weight sensing system 120 may also comprise a seat belt tension sensor. The seat 110 receives weight from the seat occupant through cushion 16 and seat back 14. The weight is transferred to an upper member 22 of the seat frame. The upper frame member 22 applies downward force to the load cells 130 located between the upper seat frame member 22 and a lower seat frame member 24. Alternately, the load cells 130 may be located between the seat and vehicle floor (not illustrated). The load cells 130 respond to downward force between upper frame member 22 and lower frame member 24 by providing pressurized fluid through fluid conduits 136'. Processing unit 136 includes a plenum 182 and a pressure sensor 92 in a pressure sensor assembly 90 and a microprocessor 236. Pressure sensor and processing unit 136 may be combined with an SDM into one package where it shares a microprocessor with the SDM. The electrical connections between the combined SDM and processing unit 136 and other parts of the vehicle are not illustrated. If processing unit 136 and the SDM are not unitary then an electrical connection (not illustrated) is provided for transmitting information from processing unit 136 to the SDM. It will be appreciated as the description proceeds that the invention may be implemented in different embodiments.

Seat occupant weight sensing system 120 will now be described with reference to FIGS. 4 through 7 but without, for now, a detailed description of seat belt tension sensing switch 252 or seat belt tension sensors 262 or 262P. Seat occupant weight sensing system 120 comprises upper frame member 22 and lower frame member 24 which may be the same as described hereinabove with reference to FIGS. 1 through 3. Other materials and manufacturing methods suitable for upper frame member 22 and lower frame member 24 may be substituted by those skilled in the relevant arts.

Each load cell 130 provides pressurized fluid through a conduit 136' to pressure sensor and processing unit 136. At pressure sensor and processing unit 136 the four conduits 136' are connected to a common plenum 182. The pressure in plenum 182 is measured by pressure sensor 92 (Please refer to FIG. 7 for illustrations of plenum 182 and pressure sensor 92). The output of the pressure sensor 92 indicates the total axial force applied to the four load cells 130. Each load cell 130 is attached by a threaded nut 26 to lower frame member 24 and by a bolt 28 to upper frame member 22.

Proceeding now with particular reference to FIG. 6, load cell 130 comprises sleeve 140, top 42, base 144, upper spring 46, lower spring 48, and liquid 60. All of the parts of load cell 130 except the sleeve 140 and base 144 are preferably the same as the corresponding parts of load cell 30 described hereinabove with reference to FIG. 3. It will be appreciated as the description proceeds that the invention may be implemented in different embodiments.

Sleeve 140 differs from sleeve 40 of load cell 30 only by the addition of fluid passage 156 which enables liquid 60 to flow freely from the interior of load cell 130 to the central fluid passage 158 of fluid conduit 136'. In all other respects sleeve 140 is preferably the same as sleeve 40. Fluid passage 156 is a small hole to allow liquid 60 to flow into fluid conduit 136'. Fluid conduit 136' is attached to sleeve 140 by a welding process such as friction welding or laser beam welding. Any other attachment method known to be suitable by those skilled in the relevant arts may be substituted. Alternately, instead of a metal tube, a metal nipple adapted for engaging a plastic tube may be attached to sleeve 40 in place of fluid conduit 136'.

Fluid conduit 136' is a tube of a metal suitable for attachment to sleeve 140. Any commercially available small diameter tube made of a metal suitable for welding or brazing to sleeve 140 is believed to be suitable. Alternately, a plastic tube may be suitable for certain applications.

Base 144 differs from base 44 of load cell 30 only by the absence of pressure sensor assembly 90 and fluid conduit 82. In all other respects base 144 is preferably the same as base 44.

Proceeding now with particular reference to FIG. 7, pressure sensor and processing unit 136 comprises a plenum 182 to which the four fluid conduits 136' are connected. A pressure sensor 92 in a pressure sensor assembly 90 senses the pressure in plenum 182 and supplies an electric signal to processing unit 236 indicating the sum of the axial forces applied to load cells 130.

Pressure sensor assembly 90 is preferably the same as pressure sensor assembly 90 described hereinabove with reference to FIGS. 1 through 3.

Pressure sensor and processing unit 136 includes microprocessor 236. Electrical conductors 196 transmit the pressure signal from pressure sensor 92 to microprocessor 236. Pressure sensor and processing unit 136 is preferably combined with an SDM into one package and, preferably, shares microprocessor 236 with the SDM. The electrical connections between the combined SDM and microprocessor 236 and other parts of the vehicle are not illustrated. If pressure sensor and processing unit 136 and the SDM are not unitary then an electrical connection (not illustrated) is provided for transmitting information from pressure sensor and processing unit 136 to the SDM.

The materials and methods referred to hereinabove are only suggestions and other materials and methods may be substituted by those skilled in the relevant arts.

The operation of the seat occupant weight sensing system 120 of the invention will now be described with reference to FIGS. 4 through 6. In operation of the system, when occupant 12 applies force to seat back 14 and seat cushion 16 the force is transmitted to the upper frame which comprises upper frame member 22. Upper frame member 22 applies the force to the four load cells 130 which forces fluid to go from load cells 130 through fluid conduits 136' to plenum 182 making the pressure in plenum 182 the same as in load cells 130. Pressure sensor 92 measures the pressure in plenum 182 which indicates the sum of the axial forces applied to the four load cells 130. The microprocessor 236 of pressure sensor and processing unit 136 subtracts the pressure when seat 110 was empty (e.g. when the seat 110 was made) from the pressure in plenum 182 and multiplies the pressure difference by a characteristic area to compute the weight of the occupant of seat 110. Pressure sensor and processing unit 136 may combine the information from load cells 130 with other information, such as seat belt tension, to further characterize the seat occupant and more accurately determine the weight of the seat occupant.

The operation of load cell 130 will now be described with particular reference to FIG. 6. When a downward force is applied to top 42 of load cell 130 that force is applied to liquid 60. The forces is distributed over the area of surface 56 which, if no liquid 60 left through conduit 136', would increase the pressure in liquid 60 by an amount equal to the applied force divided by the area of the projection on a horizontal plane of surface 56. In one very simple but unlikely case, the same force is applied to all four load cells 130 and the pressures all increase by the same amount and only infinitesimal amounts of fluid flows into or out of load cells 130. In this case there is simply a pressure increase in plenum 182 which is measured by pressure sensor 92. Microprocessor 236 multiplies the pressure increase by a factor which is substantially four times the projection of the surface 56 on a horizontal plane to obtain the increase in weight causing the pressure increase. Cases when the applied forces are not equal are described in the following.

The case when an increased axial force is applied to one of the load cells 130 and there is no change in the axial force applied to the remaining three load cells 130 is particularly instructive because the effect of the most general application of axial force to the four load cells 130 can be treated as the linear combination of four cases in which axial force is applied to one of the four load cells 130 and only to that load cell 130.

Consider the case of a four pound increment in force applied in the axial direction to a selected load cell 130 while the force applied to the other three load cells 130 remains unchanged. Some of the liquid 60 in the selected load cell will travel to the plenum 182, and from there will divide itself into three equal parts, each of which will go to one of the three load cells 130 where the applied force remained constant. The springs 46 and 48 of the selected load cell flex as the load changes and fluid leaves the selected load cell 30. The flexing accommodates the decreased volume of liquid 60 as the fluid leaves to go to plenum 182. The flexing causes the springs 46 and 48 of the selected load cell 130 to resist three pounds of the applied downward force. The springs 46 and 48 of each of the other three load cells 130 flex in the upward direction one third as much as the springs in the selected load cell 130 whereby the springs of each of the load cells 130 that were not selected apply an increased downward force (increased by one pound) on the liquid 60. The increase in downward force is one fourth of the axial force applied to the selected load cell or one pound in this case. This causes a pressure increase everywhere in the liquid 60 including in the selected load cell 130. The increased pressure applies one pound of force to surface 56 of the selected load cell. Therefore, the four pounds of axial force applied to the selected load cell is balanced by three additional pounds of force from the springs 46 and 48 of the selected load cell and one pound of additional force from the increased pressure in the liquid 60.

The example of the preceding paragraph shows that an axial force applied to one load cell 130 with no change in force applied to the remaining three load cells 130 causes a pressure increase in liquid 60 equal to the applied force divided by four times the projected area of a surface 56. Therefore, the applied force is calculated from the pressure increase by multiplying the pressure increase by four times the projected area of surface 56. This rule applies to any combination of forces applied to the four load cells 130. The total downward force applied to seat 110 through the four load cells 130 is, therefore, equal to the pressure increase times four times the projected area of surface 56.

Pressure sensor 92 responds to the pressure in liquid 60 in plenum 182 by generating an electric signal which is transmitted through conductors 98' and 98 to the outside of plenum 182. The electric signal is transmitted through electrical conductors 196 to microprocessor 236 which calculates the weight applied to the seat by subtracting, if pressure sensor 92 measures absolute pressure, the atmospheric pressure and performing the multiplications described in the preceding paragraphs.

Certain minor factors also affect the force measured by a load cell 130. When a downward force is applied to a load cell 130 the liquid 60 is compressed slightly, The resulting movement is very small because liquid 60 is substantially incompressible and because the amount of liquid 60 is small. If, in a particular application, this effect is significant, it is corrected by using a larger than actual projected area of surface 56 (determined by experiment) in the force calculation.

The seat occupant weight sensing systems 20 and 120 of the invention will now be described with reference to FIGS. 1 through 8, 14 and 15 with particular attention to seat belt tension sensing switch 252. A description of seat occupant weight sensing system 20 with reference to FIGS. 1, 2, and 3 is presented hereinabove. A description of seat occupant weight sensing system 120 with reference to FIGS. 4 through 7 is presented hereinabove. The following description is directed toward aspects of the seat occupant weight sensing systems 20 and 120 of the invention related to seat belt tension sensing switch 252 and its operation. Referring particularly to FIGS. 8, 14 and 15, seat belt tension sensing switch 252 comprises anchor segment 52', insulator 60', spring 62', latch carrier 64' and insulating pad 70'. The variations of seat belt tension sensing switch 252 illustrated in FIGS. 14 and 15 also comprise a permanent magnet 68" and a magnetically actuated switch 58" (FIG. 14) or 58''' (FIG. 15). Seat belt tension sensing switch 252 is connected with processing unit 36 or with pressure sensor and processing unit 136 by electrical cable 252' having conductors 252a' and 252b'.

Anchor segment 52' comprises an extension 54' for attaching to seat 10 or to the vehicle, and an enlarged bead 56' with electrical contact surface 58'. Anchor segment 52' is preferably formed of steel rod 54' on which enlarged head 56' is formed by cold heading or another process known to be suitable by those skilled in the relevant arts. Electrical contact surface 58' (FIG. 8 only) is preferably plated with a rust resisting material suitable for electric contacts such as nickel. Insulator 60' is a sleeve preferably made of a plastic such as fiber filled polyester for preventing electrical contact between anchor segment 52' and latch carrier 64' and for transmitting force from spring 62' to ledge 72' of latch carrier 64'. Spring 62' is a coil spring that flexes to allow latch carrier 64' to move upward to contact head 56' when a predetermined upward force such as 10 pounds is applied. Latch carrier 64' comprises sleeve 66' with ledge 72' for engaging insulator 60', electrical contact surface 68' (FIG. 8 only) and upper segment 74' for connecting to a seat belt or seat belt buckle latch (not illustrated). Upper segment 74' is attached to sleeve 66' by threads 76'. Electrical contact surface 68' is preferably plated with a rust resisting material such as nickel. Insulating pad 70' is a disk of an insulating plastic (pad 70' does not need to be an electrical insulator in the embodiments illustrated in FIGS. 14 and 15) such as polyethylene for electrically insulating head 56' from upper segment 74' of latch carrier 64'.

Referring now to FIG. 8, seat belt tension sensing switch 252 closes when seat belt tension overcomes the force of spring 62' and electrical contact surface 58' makes electrical contact with electrical contact surface 68'. Electrical contact surfaces 58' and 68' are electrically connected with conductors 252a' and 252b' respectively whereby processing unit 36 or pressure sensor and processing unit 136 sees an open circuit at electrical cable 252' when switch 252 is open and a closed circuit when switch 252 is closed. A continuing stress greater than seven pounds indicates with good reliability that seat 10 or 110 contains a tightly belted child seat because such a high stress is uncomfortable to a person.

Referring now to FIG. 14, a variation of seat belt tension sensing switch 252 is illustrated that differs from the switch 252 illustrated in FIG. 8 by the addition of permanent magnet 68" and Hall effect switch 58" and the connection of electrical conductors 252a' and 252b' to Hall effect switch 58". Permanent magnet 68" is movable with latch carrier 64' and Hall effect switch 58" is affixed to anchor segment 52' for activation by permanent magnet 68" when permanent magnet 68' moves with latch carrier 64' into close proximity to Hall effect switch 58". Hall effect switch 58" is connected through electrical cable 252' with microprocessor 236. Referring now to FIG. 15, a variation of seat belt tension sensing switch 252 is illustrated that differs from the switch 252 illustrated in FIG. 14 by the replacement of Hall effect switch 58" by reed switch 58''' and the connection of electrical conductors 252a' and 252b' to reed switch 58'''. Reed switch 58''' is positioned to be operated by permanent magnet 68" when permanent magnet 68" moves with latch carrier 64' into close proximity to reed switch 58'''. Other switches known to be suitable may be substituted by those skilled in the art of electrical switches.

The materials and methods referred to hereinabove are only suggestions and other materials and methods may be substituted by those skilled in the relevant arts.

The operation of the seat occupant weight sensing system of the invention will now be described with particular reference to FIGS. 1 through 8, 14 and 15. FIGS. 8, 14 and 15 illustrate a switch that changes state when seat belt tension reaches a predetermined seat belt tension. During normal operation of the vehicle, spring 62' applies force to insulator 60' causing latch carrier 64' to remain in its low position illustrated in FIGS. 8, 14 and 15 wherein seat belt tension sensing switch 252 is open (closed if switch 252 comprises reed switch 58''') because there is no electrical contact between contact surfaces 58' and 68'. For momentary periods lasting up to a few seconds during hard braking and on rough roads the seat belt (not illustrated) applies upward force to latch carrier 64' causing it to overcome the force of spring 62' and move upward, which brings contact surfaces 58' and 68' together or brings permanent magnet 68" and electronic switch 58" or 58''' in close proximity to close switch 252 (open switch 252 if switch 252 comprises reed switch 58''') for the aforementioned momentary periods. Processing unit 36 or pressure sensor and processing unit 136 monitors the state of switch 252 and, if it changes momentarily, takes no action. If a child seat is tightly belted into seat 10 or 110 then the seat belt (not illustrated) will apply constant upward force to latch carrier 64' sufficient to cause it to overcome the force of spring 62' and move upward thereby bringing contact surfaces 58' and 68' together to close switch 252 and keep it closed constantly (open switch 252 and keep it open constantly if switch 252 comprises reed switch 58'''). Conductors 252a' and 252b' of cable 252' communicate the open or closed condition of switch 252 to processing unit 36 or pressure sensor and processing unit 136, which monitors the closure of switch 252 and, if it remains closed (open if switch 252 comprises reed switch 58''') for a long period such as twenty seconds, registers that seat 10 contains a tightly belted child seat. Also, at initial power on if switch 252 is closed (open if switch 252 comprises reed switch 58''') processing unit 36 or pressure sensor and processing unit 136 registers that seat 10 contains a tightly belted child seat for as long as switch 252 indicates large seat belt tension.

Continuing to describe the operation of the seat occupant weight sensing system of the invention with reference to FIGS. 1 through 8; When power is first turned on and the vehicle engine is started, processing unit 36 receives pressure readings from load cells 30 or microprocessor 236 receives a pressure reading from pressure sensor 92. Processing unit 36, or microprocessor 236 then calculates the weight applied to the seat from the pressure sensor outputs by the processes described elsewhere herein with reference to FIGS. 1 through 7. If the weight is Less Than a predetermined weight then processing unit 36 or microprocessor 236 registers that the seat is not occupied and that the occupant protection system for that seat should not be deployed. If the weight is larger than the aforementioned predetermined weight then processing unit 36 or 236 tentatively registers a seat occupant weight based on the output of load cells 30 or pressure sensor 92.

If a seat belt tension sensing switch 252 is present, processing unit 36 or microprocessor 236 continues by determining if switch 252 is closed. If switch 252 remains closed (open if switch 252 comprises reed switch 58''') for longer than a momentary time then processing unit 36 or microprocessor 236 changes its previous decision and tentatively registers that the seat is occupied by a child seat and that the weight of the occupant is unknown. This is quite likely to be correct but there is a small probability that an adult has tightened the seat belt unusually tight. This is likely to be resolved by the adult loosening the belt. In the case where the weight is very large such as more than 160 pounds the microprocessor assumes it is not a child in a child seat and indicates that the occupant is an adult.

The following describes in detail the reasoning that justifies using a seat belt tension sensing switch to distinguish between an adult seat occupant and a child in a child seat held by seat belts under such tension that processing unit 36 or pressure sensor and processing unit 136 could indicate an adult. A seat belt tension sensing switch equivalent to switch 252 illustrated in FIG. 8 is required.

The description of the operation of the seat occupant weight sensing systems 20 and 120 of the invention follows with particular reference to FIGS. 1 through 8. Each of the conditions that might occur during operation are considered in the following to show how the weight sensing systems 20 and 120 in combination with seat belt tension sensing switch 252 correctly identifies each condition to insure correct operation of the airbag.

The following 14 cases summarize the possible cases of normally seated (as distinct from out of position) human occupants of a vehicle seat. There are seven different categories of seat occupant which is doubled to 14 cases by the possibilities of the seat belt tension sensing switch 252 being either open or closed: 1) An infant weighing up to 18 pounds in an infant seat anchored with a seat belt that is a) not under sufficient tension to operate switch 252 b) is under sufficient tension to operate switch 252. 2) A child weighing up to forty pounds in a forward facing child seat of the type that provides its own belt restraint that is anchored with a seat belt that a) is not or b) is under sufficient tension to operate switch 252. 3) A child weighing up to 55 pounds in a forward facing child seat of the type that uses the vehicle seat belts to restrain the child and the vehicle seat belts that a) are not or b) are under sufficient tension to operate switch 252. 4) A child weighing Less Than 66 pounds seated normally in the vehicle seat and belted with belts that a) are not or b) are under sufficient tension to operate switch 252. 5) A child weighing over 66 pounds seated normally in the vehicle seat and belted with belts that a) are not or b) are under sufficient tension to operate switch 252. 6) An adult weighing under 110 pounds seated normally in the vehicle seat and belted with belts that a) are not or b) are under sufficient tension to operate switch 252. 7) An adult weighing over 110 pounds seated normally in the vehicle seat and belted with belts that a) are not or b) are under sufficient tension to operate switch 252.

The operation of the seat occupant weight sensing systems 20 and 120 of the invention is described below for each of the aforementioned 14 cases. It is desired to assure with high confidence that the airbag will not deploy if the seat is occupied by an infant or child weighing Less Than 30 kilograms (66 pounds) and to assure with high confidence that the airbag will deploy if the seat is occupied by an adult weighing more than 50 kilograms (110 pounds). To make this distinction, airbag deployment is permitted if the occupant weight is measured to be above 75 pounds. In each case the seat belt tension sensing switch 252 operates at 7 pounds of seat belt tension which is believed to approximate the largest tension likely to be acceptable to an adult for an extended period of time. It will be obvious from the following to prepare similar analysis for other airbag deployment criteria.

Case 1—An Infant Weighing Less Than 18 Pounds in an Infant Seat

The occupant weight measured by the seat occupant weight sensing systems 20 or 120 of the invention derives from the combined weight of the infant and the infant seat plus force applied by the seat belt. If the seat belt tension is between 0 and 7 pounds seat belt tension sensing switch 252 so indicates and the total force applied by the seat belt is twice the seat belt tension or between 0 and 14 pounds applied at an angle of about thirty degrees from the vertical so it has a total downward component between 0 and 12 pounds. Assuming the infant seat weighs 15 pounds, the total of the downward forces from the weight of the infant, the infant seat and the seat belt (18+15+12) makes the seat occupant appear to weigh up to 45 pounds. Because the weight is Less Than 75 pounds processing unit 36 or pressure sensor and processing unit 136 asserts that the airbag should not be deployed.

If the seat belt tension is over 7 pounds switch 252 is operated and processing unit 36 or pressure sensor and processing unit 136 of seat occupant weight sensing systems 20 or 120 respectively asserts that the seat is occupied by a child seat and therefore the airbag should not be deployed. It is believed that no adult will tolerate a constant seat belt tension greater than seven pounds but if it happens that a large adult will tolerate a tension larger than seven pounds then possible ambiguity can be prevented by programming the microprocessor of processing unit 36 or microprocessor 236 to ignore seat belt tension switch 252 if the seat occupant weight indicates a large adult such as an adult weighing over 160 pounds. This method of assuring accurate interpretation is based on the fact that it is unlikely that seat belt tension applied to an infant seat would cause sufficient downward force to indicate the weight of a large adult. For instance, if "large adult" is found to mean an adult weighing over 160 pounds then the seat belt would need to have a very high tension such as 77 pounds (obtained by the calculation 0.5*(160−12−15)/cosine(30 degrees)) to simulate a large adult which is unrealistic. Therefore, it is reasonable to ignore seat belt tension switch 252 when the weight of a large adult is sensed.

Case 2—A Child Weighing Less Than 40 Pounds in a Forward Facing Child Seat

The occupant weight measured by the seat occupant weight sensing systems 20 or 120 of the invention derives from the combined weight of the child and the child seat plus force applied by the seat belt. If the seat belt tension is between 0 and 7 pounds at seat belt tension sensing switch 252, the total force applied by the seat belt is twice the seat belt tension or between 0 and 14 pounds applied at an angle of about thirty degrees from the vertical so it has a total downward component between 0 and 12 pounds. Assuming the child seat weighs 15 pounds, the total of the downward forces from the weight of the child, the child seat and the seat belt tension makes the seat occupant appear to weigh up to 67 (40+15+12) pounds. Because the measured weight is Less Than 75 pounds processing unit 36 or microprocessor 236 asserts that the airbag should not be deployed.

If the seat belt tension is over 7 pounds switch 252 will operate and processing unit 36, or microprocessor 236 of seat occupant weight sensing systems 20 or 120 respectively asserts that the seat is occupied by a child seat and therefore the airbag should not be deployed. It is believed that no adult will tolerate a fit constant seat belt tension greater than seven pounds but if it happens that a large adult will tolerate a tension slightly larger than seven pounds then possible ambiguity can be prevented by programming processing unit 36 or microprocessor 236 of pressure sensor and processing unit 136 to ignore seat belt tension switch 252 if the seat occupant weight indicates a large adult. This method of assuring accurate interpretation is based on the fact that it is unlikely that seat belt tension applied to a child seat would cause sufficient downward force to indicate the weight of a large adult. For instance, if "large adult" is found to mean an adult weighing over 160 pounds, then the seat belt would need to have a very high tension such as 67 pounds (obtained by the calculation 0.5*(160−30−14)/cosine (30 degrees)) to simulate a large adult which is unlikely to be applied when installing a child seat. Therefore, seat belt tension switch 252 can be ignored when the weight of a large adult is sensed.

Case 3—A Child Weighing up to 55 Pounds in a Forward Facing Child Seat

The type of seat that accommodates a 55 pound child uses the vehicle seat belts to restrain the child. It does not provide a separate restraint. Therefore the seat belt tension would be approximately zero because any substantial tension would make the child uncomfortable.

The occupant weight measured by the seat occupant weight sensing systems 20 or 120 of the invention derives from the combined weight of the child and the child seat since force applied by the seat belt is approximately zero. For example, if the child seat weighs 12 pounds, the total of the downward forces from the weight of the child and the child seat makes the seat occupant appear to weigh up to 67 pounds (55 pounds plus 12 pounds for the seat) for a 55 pound child. Because the weight measures Less Than 75 pounds processing unit 36 or pressure sensor and processing unit 136 asserts that the seat is occupied by a person weighing Less Than 75 pounds and that the airbag should not be deployed. Although it might appear that this discrimination is marginal, a 55 pound child tolerating even a five pound seat belt tension is so unlikely that the discrimination is reasonable.

In the unlikely circumstance that the seat belt tension is over 7 pounds the seat belt tension switch 252 is operated and processing unit 36 or microprocessor 236 of occupant weight sensing systems 20 or 120 respectively asserts, correctly, that the seat contains a child seat and the airbag should not be deployed Case 4—A Child Weighing up to 66 Pounds Seated in the Vehicle Seat A child weighing almost 66 pounds would install the belts by himself or herself. Therefore the seat belt tension would be near zero for two reasons: Firstly, it would be difficult for a 66 pound child to install the belt at a tension approaching 7 pounds. Secondly, any substantial tension would make the child uncomfortable. Accordingly, near zero seat belt tension is assumed.

The weight of the child is measured by the weight sensing systems 20 or 120 to be the actual weight of the child. Because the weight is Less Than 66 pounds, which is Less Than 75 pounds, processing unit 36 or microprocessor 236 asserts that the seat is occupied by a person weighing Less Than 75 pounds and that the airbag should not be deployed.

Case 5—A Child Weighing More Than 66 Pounds Seated in the Vehicle Seat

A child weighing this much would install the belts himself or herself. Therefore the seat belt tension would be near zero for two reasons: Firstly, it would be difficult for a child to exert the force required to install the belt at a tension approaching 7 pounds. Secondly, any substantial tension would make the child uncomfortable. Accordingly, near zero seal belt tension is assumed.

Airbag deployment is acceptable but is not required for a child having a weight in this range. The weight of the child is measured by the weight sensing systems 20 or 120 to be the actual weight of the child except if the child is large enough some of its weight is applied to the vehicle floor and its measured weight is reduced by the weight applied to the floor. If the weight measures less than 75 pounds processing unit 36 or microprocessor 236 signals that airbag deployment should be suppressed. If the weight measures between 75 pounds and the weight of a small adult such as 110 pounds the SDM may limit the airbag inflator to low energy deployment because the seat occupant is a small person.

Case 6—An Adult Weighing Less Than 110 Pounds Seated in the Vehicle Seat

The seat belt tension would be approximately zero because any substantial tension would make the small adult uncomfortable.

Airbag deployment is preferred but is not required for an adult having a weight in this range. The weight of the adult is measured by the weight sensing systems 20 or 120 to be approximately the actual weight of the adult except if the person is large enough some of the weight is applied to the vehicle floor and the measured weight is reduced by the weight applied to the floor. If the weight measures Less Than 75 pounds processing unit 36 or microprocessor 236 of seat occupant weight sensing system 20 or 120 respectively signals that airbag deployment should be suppressed. If the weight measures between 75 pounds and 110 pounds the SDM may limit the airbag inflator to low energy deployment because the seat occupant is a small person.

Case 7—An Adult Weighing More Than 110 Pounds Seated in the Vehicle Seat

The seat belt tension would be approximately zero because any substantial tension would make the adult uncomfortable. However, it may be argued that a large adult might tolerate a seat belt tension such as 7 pounds.

Airbag deployment is required for an adult having a weight in this range. The weight of the adult is measured by the weight sensing systems 20 or 120 to be approximately the actual weight of the adult reduced by the weight applied by the occupant's feet to the vehicle floor which might reduce the weight to 76 pounds. If the weight measures below 110 pounds, processing unit 36 or 236 may limit the airbag inflator to low energy deployment because the seat occupant is a small person.

Without a seat belt tension switch 252 the deployment decision reached in the preceding 7 cases is unambiguous except in cases 1 and 2 and is only ambiguous in cases 1 and 2 if the tension of the seat belts holding the child or infant seat is so high that the weight sensing systems 20 or 120 indicate a weight of over 75 pounds which might lead to deployment of an airbag with an infant or child in the passenger seat. Such high weight measurements are only possible if the seat belts are anchored to the floor. Anchoring the seat belts to the seat prevents tension in the seat belt from affecting the weight sensed by load cells located between the seat and the vehicle floor. If the seat belts are anchored to the seat and there is a belt playout in the pillar behind the vehicle door, any seat belt tension operates to reduce the apparent weight of the child seat or person in the vehicle seat which operates against deploying an airbag when the seat contains a baby or child.

With a seat belt tension switch 252 the ambiguity in cases 1 and 2 is resolved in the case when the belts are anchored to the vehicle by requiring seat belt tension switch 252 to be continuously open (closed if switch 252 comprises reed switch 58''') for most of the time prior to airbag deployment. Most of the time means that brief periods of switch operation such as might happen when the vehicle goes over a sharp rise do not negate airbag deployment.

Seat belt tension switch 252 raises the possibility for case 7 to be ambiguous because a large adult could set the belt tension sufficiently high to operate switch 252. To prevent ambiguity ID case 7, processing unit 36 or pressure sensor and processing unit 136 considers the weight of the seat occupant and if the occupant weight is above a predetermined weight then processing unit 36 or pressure sensor and processing unit 136 ignores seat belt tension switch 252. For example if the weight of the seat occupant is greater than 160 pounds it is unlikely that the occupant is a baby or small child and switch 252 may be ignored.

Instead of a switch, a seat belt tension sensor may be substituted. A tension sensor resolves ambiguities regarding whether a seat occupant is a child in a child seat tightly belted to the vehicle seat or is an adult. Seat belt tension sensing switch 252 can be replaced with a seat belt tension sensor such as seat belt tension sensors 262 or 262P described hereinbelow. For example, if the tension in the belt remained constant at 12 pounds then 24 pounds times the cosine of the angle of the belt from the vertical would be subtracted from the measured weight to obtain a revised weight estimate. This process correctly identifies the seat occupant weight in all cases without any ambiguity. If the seat belt tension is known, twice the vertical component of the tension force is subtracted from the measured seat occupant weight to obtained a corrected value for the seat occupant's weight.

Proceeding now with particular reference to FIGS. 9 and 10, seat belt tension sensor 262 comprises two bowed metal bands 264 and 266 unitary at their lower ends with loop 268. Bands 264 and 266 are joined at their upper ends by rivet 272 to extension 274 of seat bell latch 276. Loop 268 attaches bands 264 and 266 to anchor 278 and forms a flexible joint that allows seat belt tension sensor 262 to rotate about the axis of loop 268. A permanent magnet 286 mounted in a holder 282 is attached by nut 284 to band 266. A magnetic field sensor 292 is mounted on a holder 290 which is attached by nut 294 to band 264. Anchor 278 is attached to seat 10 or 110 by stud 296 and nut 298. In other applications, anchor 278 may be attached to the vehicle structure instead of to seat 10 or 110.

Bands 264 and 266 are preferably unitary with loop 268 and formed of a strip of spring steel. Alternately, mild steel or a nonmagnetic stainless steel may be used to prevent magnetization of the bands 264 and 266 which could affect performance. Rivet 272 may be any conventional fastener such as a rivet suitable for providing a strong joint between bands 264 and 266 and extension 274.

Seat belt latch 276 may be any conventional seat belt latch for latching to the tongue at the end of a seat belt. Extension 274 is preferably made of steel with an opening 275 and bearing end 277. Extension 274 is strongly attached to seat belt latch 276 for transmitting the full force applied by an occupant to the seat belt during a vehicle crash. Opening 275 forms a passage through which magnet 286 and magnetic field sensor 292 can approach each other when seat belt tension is applied. Bearing end 277 fits slidingly between bands 264 and 266 where they join loop 268. Bearing end 277 may be plated or coated with a material (not shown) to minimize wear and friction during the lifetime of the vehicle.

Anchor 278 is preferably a steel stamping with an opening sized to accommodate loop 268 and a second opening sized to accommodate stud 296. Stud 296 may be a conventional threaded stud as illustrated in which case nut 298 holds anchor 278 fixedly in its position when tightened. Stud 296 may also have a shoulder (not illustrated) for nut 298 to abut which would allow anchor 278 to rotate about stud 296. If the aforementioned shoulder (not illustrated) is provided means may be included to limit the rotation of anchor 278 about stud 296.

Magnet 286 is preferably a disk formed of a permanent magnet material. One of the neodymium iron boron compositions is preferred for its higher magnetic field with lower dependence of the magnetic field on temperature. An alnico magnet of a composition that does not require a keeper is more constant with temperature but produces a lower magnetic field. Other permanent magnet materials may be substituted by those expert in the field of magnet position sensing. Magnet 286 is mounted in holder 282 which may be made of plastic or metal. If holder 282 and bands 264 and 266 are made of magnetically soft material, magnetic flux will carried by the holder 282 and bands 264 and 266 which will make the magnetic field at magnetic field sensor 292 dependent on the magnetic qualities of bands 264 and 266. The assembly of magnet 286 and bolder 282 is mounted by nut 284 to band 266. Any other suitable means for measuring distance between bands 264 and 266 may be substituted by those skilled in the relevant arts.

Magnetic field sensor 292 may be any commercially available linear Hall effect magnetic field sensor designed for the expected range of magnetic fields. For smaller magnetic fields any of the many commercially available magnetoresistive sensors designed for the expected range of magnetic fields may be used. A large selection of suitable magnetic field sensors is commercially available from many suppliers.

The materials and methods referred to hereinabove are only suggestions and other materials and methods may be substituted by those skilled in the relevant arts.

The operation of the seat belt tension sensor 262 of the invention will now be described with particular reference to FIGS. 9 and 10. When there is no seat belt tension, bands 264 and 266 are bowed to the maximum amount which is illustrated in FIG. 9. This causes permanent magnet 286 and magnetic field sensor 292 to be at their maximum distance from each other. The magnetic field at magnetic field sensor 292 increases as the distance from permanent magnet 286 decreases. Therefore, the field at magnetic field sensor 292 is at its minimum in the configuration illustrated in FIG. 9 and is near its maximum in the configuration illustrated in FIG. 10.

When tension in the seat belt indicated by arrow 276F is applied to seat belt latch 276, the tension is transferred to extension 274 which applies the tension through rivet 272 to bands 264 and 266. The tension in bands 264 and 266 causes them to straighten toward the straightness illustrated in FIG. 10. When bands 264 and 266 straighten under tension, magnet 286 is brought closer to magnetic field sensor 292. The closer magnet 286 gets to magnetic field sensor 292 the greater the field at magnetic field sensor 292 becomes. Therefore, the magnetic field at magnetic field sensor 292 is greater when there is greater tension in the seat belt. Accordingly, output of magnetic field sensor increases monotonically as the tension 276F the seat belt applies to seat belt latch 276 increases. The output signal from magnetic field sensor 292 goes through cable 262' which goes to processing unit 36 or to microprocessor 236 indicating the magnitude of the magnetic field at magnetic field sensor 292 and, therefore, indicating the tension 276F received by seat belt latch 276. The precise relationship between the tension 276F applied to seat belt tension sensor 262 and the output of magnetic field sensor 292 depends on the stiffness and curvature of bands 264 and 266 and other specific features of the design. For converting magnetic field to force a table is stored in microprocessor 236 or in the microprocessor of processing unit 36 containing force measurements corresponding to a number of magnetic field levels. When the microprocessor receives a magnetic field measurement from magnetic field sensor 292 it determines the seat belt tension by looking up in the table the tension corresponding to the magnetic field. Other methods for relating magnetic field to seat belt tension may be substituted by those skilled in the relevant arts.

The seat belt may apply a lateral force indicated by arrow 276L in FIG. 10 in addition to the axial force indicated by arrow 276F. This can happen if free rotation of seat belt tension sensor 262 about loop 268 is prevented. The lateral force applies a torque to seat belt latch 276 and to extension 274. If extension 274 did not have its extended length but terminated immediately below rivet 272 (like extension 274" illustrated in FIG. 11) then the torque would distort bands 264 and 266 and make the seat belt tension readings depend on both the tension and the angle at which the tension is applied to latch 276. The extended length of extension 274 prevents this by transferring the torque to the contact between end 277 of extension 274 and loop 268 between bands 264 and 266 thereby preventing the torque from being applied to bands 264 and 266 at rivet 272 and affecting the accuracy of seat belt tension sensor 262.

The operation of the seat occupant weight sensing system of the invention will now be described with particular reference to FIGS. 9 through 11. During normal operation of the vehicle when there is little or no seat belt tension, the resiliency of bands 264 and 266 or 264" and 266" cause them to remain in their curved state illustrated in FIG. 9 and the output of magnetic field sensor 292 or force sensor 30" is at its minimum indicating there is no tension in the seat belt. For momentary periods lasting a few seconds, such as during hard braking and on rough roads, the seat belt (not illustrated) applies upward force 276F to seat belt latch 276 causing bands 264 and 266 or 264" and 266" to momentarily straighten and seat belt tension sensor 262 or force sensor 30" to indicate the seat belt tension for the aforementioned momentary periods. Processing unit 36 or microprocessor 236 monitors the output of magnetic field sensor 292 or force sensor 30" and, if the increased output is momentary, takes no action. If a child seat (not illustrated) is tightly belted into seat 10 or 110 then the seat belt (not illustrated) may apply a constant upward force 276F to seat belt latch 276 causing the output of magnetic field sensor 292 or force sensor 30" to go to a higher level and remain at that higher level indefinitely. Conductors of cable 262' or 262" communicate the output of magnetic field sensor 292 or force sensor 30" respectively to processing unit 36 or the microprocessor 236. If the magnetic field sensed by magnetic field sensor 292 or the force sensed by force sensor 30" remains at a value for an extended period such as twenty seconds processing unit 36 or pressure sensor and processing unit 136 calculate the weight of the seat occupant as described in the following:

The weight of the occupant of seat 10 or 110 is preferably determined by a two step process of which the following is an example. In the first step the microprocessor of processing unit 36 or pressure sensor and processing unit 136 measures the seat occupant's weight by the process described hereinabove with reference to FIGS. 1 through 7 which does not use knowledge of seat belt tension. The microprocessor of processing unit 36 or pressure sensor and processing unit 136 then computes the product of twice the tension in the seat belt as measured by seat belt tension sensor 262 times the cosine of the angle of the seat belt from the vertical. The product is subtracted from the measured weight and the difference is the final weight determination. Other processes for determining seat occupant weight from the available information will now occur to those skilled in the relevant arts.

Proceeding now with particular reference to FIG. 11, seat belt tension sensor 262P resembles seat belt tension sensor 262 illustrated in FIGS. 9 and 10 but is different in that force sensor 30" comprising a fluid filled bellows sided bottle and a pressure sensor replaces the combination of permanent magnet 286 and magnetic field sensor 292, and an outer cover 280 is included. All elements of seat belt tension sensor 262P illustrated in FIG. 11 that are or may be the same as the corresponding elements of seat belt tension sensor 262 are identified by the same numbers as are used in FIGS. 9 and 10. Seat belt tension sensor 262P comprises two bowed bands 264" and 266" joined at their lower ends by loop 268". Bands 264" and 266" are joined at their upper ends by rivet 272" to extension 274" of seat belt latch 276 and to outer cover 280. Loop 268" attaches bands 264" and 266" to anchor 278. Force sensor 30" is located where it is squeezed between bands 264" and 266". Anchor 278 is attached to seat 10 or to seat 110 by stud 296 and nut 298. In other applications anchor 278 may be attached to the vehicle structure instead of being attached to a seat such as seat 10 or seat 110. Force sensor 30" may be replaced by any other force sensor known to be suitable by those skilled in the relevant arts.

Bands 264" and 266" are preferably unitary with loop 268" and formed of a strip of a material such as spring steel. However, the designer can select any material that offers sufficient strength and resiliency. Extension 274" extends between seat belt latch 276 and bands 264" and 266". Seat belt latch 276 and anchor 278 are or may be the same as the corresponding elements of seat belt tension sensor 262 and the reader is referred to the descriptions of those elements given hereinabove with reference to FIGS. 9 and 10 for their description. Rivet 272" is longer than rivet 272. Outer cover 280 is preferably a sleeve of rectangular cross section adapted for rigid attachment by rivet 272" to bands 264" and 266" and extension 274". Outer cover 280 slidably engages loop 268". A preferred material for outer cover 280 is mild steel or an HSLA steel.

The materials and methods referred to hereinabove are only suggestions and other materials and methods may be substituted by those skilled in the relevant arts.

The operation of the seat belt tension sensor 262P of the invention will now be described with particular reference to FIG. 11. When tension 276F in the seat belt is applied to seat belt latch 276 the tension is transferred to extension 274" which applies the tension through rivet 272" to bands 264" and 266". The tension in bands 264" and 266" causes them to attempt to straighten. When attempting to straighten, bands 264" and 266" apply force to force sensor 30" causing it to transmit a signal through cable 262" indicating a measure of the force. The force is proportional to the tension in the seat belt. Consequently, the force signal from force sensor 30" indicates the tension in the seat belt.

The seat belt may apply a lateral force indicated by arrow 276L in addition to force indicated by arrow 276F. This can happen if free rotation of seat belt tension sensor 262P at loop 268" is limited by an obstacle such as a part of a seat. The lateral force applies a torque to seat belt latch 276 and to extension 274". Without outer cover 280 being rigidly affixed to extension 274" by rivet 272", the torque would distort bands 264" and 266" and make the seat belt tension readings depending on both the tension and the angle at which the tension is applied to latch 276. Outer cover 280 prevents this by transferring the torque to loop 268" thorough the contact between outer cover 280 and loop 268" thereby preventing the torque from being applied to bands 264" and 266" at rivet 272". Further, outer cover 280 protects bands 264" and 266" from externally applied forces, which might happen if lateral force caused seat belt tension sensor 262P to rotate at loop 268" until band 264" or 266" contacted an obstacle such a part of a seat.

The materials and methods referred to hereinabove are only suggestions and other materials and methods may be substituted by those skilled in the relevant arts.

Figure 13:
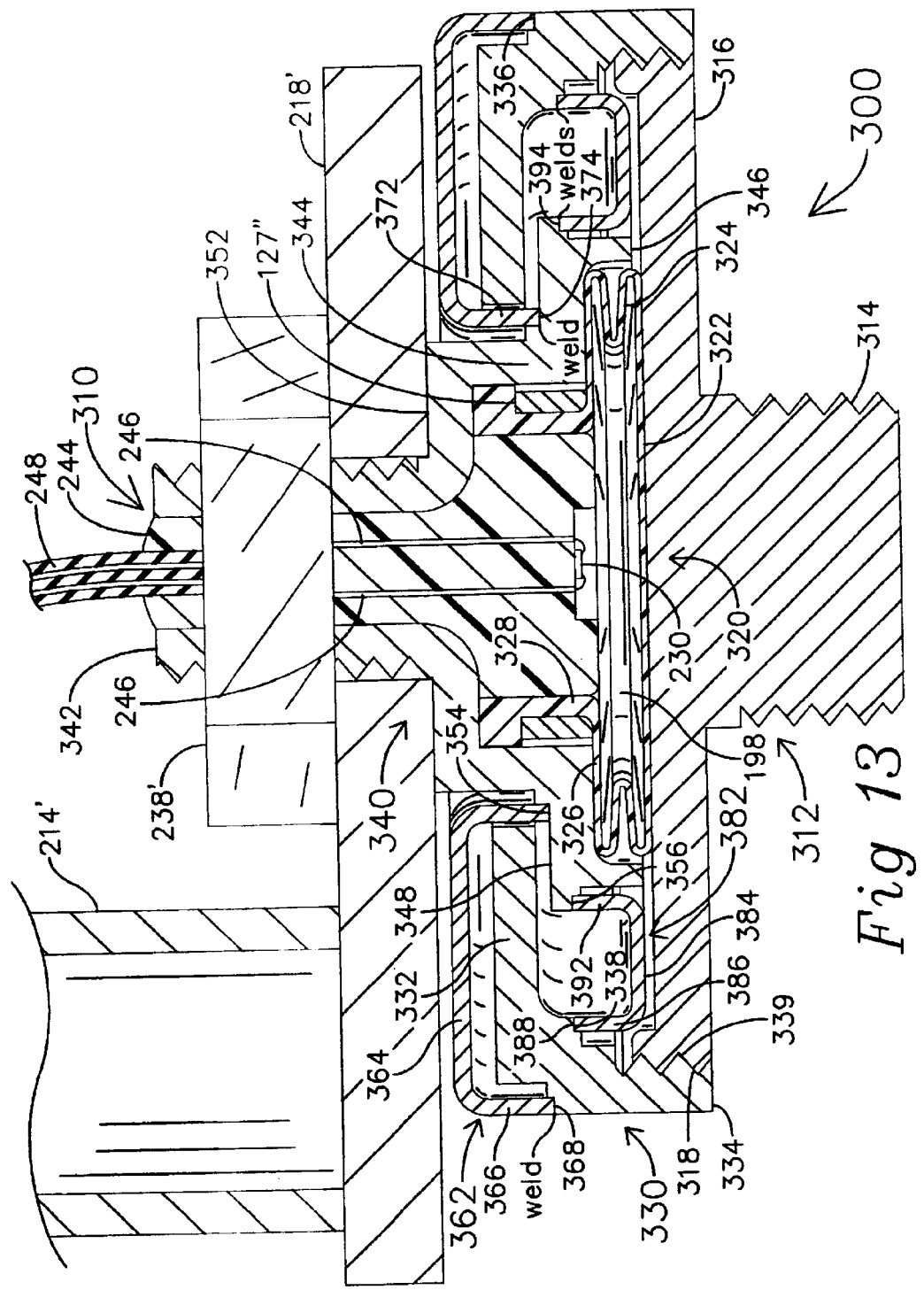
FIG. 13 shows an alternate load cell comprising a discrete force sensor adapted to receive force from a base and a force transmitter.

Proceeding now with particular reference to FIG. 13, load cell 300 comprises a force sensor 310, a base 312, a retainer 330, a force transmitter 340, and springs 362 and 382.

Force sensor 310 comprises bottle 320 filled with liquid 198, pressure sensor 230, stopper and electrically insulating feedthrough 244, electrical conductors 246, electrical cable 248 and clamping ring 127". Bottle 320 comprises base 322, bellows shaped sides 324, shoulder 326 and neck 328. Pressure sensor 230 of force sensor 310 provides an electrical signal through conductors 246 and electrical cable 248 to a processing unit such as processing unit 36. Other force sensors known to be suitable by those skilled in the relevant arts may be substituted for force sensor 310.

Base 312 comprises a threaded stud 314 and a flat circular disk 316 having threads 318 on its outer periphery. Base 312 is preferably made of steel for strength and low cost. Threaded stud 314 engages the threads of a threaded fastener affixed to the vehicle (not illustrated) for retaining load cell 300 during large upward forces which might result from a collision of the vehicle. Threaded fasteners are, typically, unitary with the floor of the vehicle. In a typical current production design threaded fasteners are welded to the horizontal part of a "U" shaped beam which is then turned upside down and welded to the vehicle floor.

Retainer 330 comprises flange 332, a cylindrical extension 334 and surfaces 336 and 338 for attachment to springs 362 and 382. Cylindrical extension 334 has threads 339 on its inside diameter for engaging threads 318. Retainer 330 is preferably made of the same steel as base 312 for compatibility and low cost.

Force transmitter 340 comprises threaded neck 342, force applicator 344 incorporating stop 346 and abutment 348, ledge 352, and two surfaces 354 and 356 for attachment to springs 362 and 382. Force transmitter 340 receives force from a seat flange 218' at ledge 352 and also receives force from springs 362 and 382 at surfaces 354 and 356 and transmits the total force received to force sensor 310. Force transmitter 340 is preferably made of the same steel as base 312.

Upper spring 362 comprises a washer shaped base 364, outer flange 366 ending at surface 368 and inner flange 372 ending at surface 374. Upper spring 362 is formed of a spring steel into the form of half a torus of rectangular cross section. After forming, upper spring 362 is tempered and washer shaped base 364 is stressed to cause it to take on a shallow conical shape like a Belleville spring. For best resistance to radial forces the conical height is set so base 364 is flat when stressed to its operating position for providing preload force in the completed load cell.

Lower spring 382 comprises a washer shaped base 384, outer flange 386 ending at surface 388 and inner flange 392 ending at surface 394. Lower spring 382 is formed of a spring steel into the form of half a torus of rectangular cross section. After forming, lower spring 382 is tempered and washer shaped base 384 is stressed to cause it to take on a shallow conical shape like a Belleville spring. For best resistance to radial forces the conical height is set so that base 384 is flat when stressed to its operating position for preloading load cell 300.

The output of load cell 300 will be independent of temperature if the coefficients of thermal expansion of the liquid 198 and bottle 320 in combination cause the resting height of shoulder 326 above base 322 of bottle 320 to have the same dependence on temperature as the separation of the surface of base 312 that is in contact with base 322 of bottle 320 and the surface of force transmitter 340 that is in contact with shoulder 326 of bottle 320.

Commercially available force sensors are provided by Kavlico Corporation of Moorpark, Calif. and others that have very small thermal expansion coefficients. One of these force sensors may be placed against a disk of a higher thermal expansion material such as aluminum to achieve a thermal expansion coefficient in the combination matching the thermal expansion coefficient of the steel parts of load cell 300. This is a preferred method for making the output of load cell 300 be independent of temperature.

It may be preferred to let the output signal of the force sensor vary with temperature and provide temperature compensation elsewhere such as in processing unit 36.

A preferred method of manufacturing load cell 300 is summarized in this paragraph and described in detail in the following paragraphs: The retainer 330, force transmitter 340, and springs 362 and 382 are joined into an assembly. The force sensor 310 is then inserted into the assembly and base 312 is installed followed by welding or other means to make the position of base 312 permanent.

Firstly, lower spring 382 is joined to force transmitter 340, preferably by a friction welding machine. In the friction welding machine either lower spring 382 or force transmitter 340 is rotated at a high rate of rotation and surface 394 of lower spring 382 is pressed against surface 356 of force transmitter 340. While the surfaces are pressed together the rotation slows to a stop at a time determined so that the parts are welded together and are in the desired relative positions.

Secondly, the assembly created according to the process described in the preceding paragraph comprising lower spring 382 and force transmitter 340 is joined to retainer 330 by friction welding. In the friction welding machine either the assembly including lower spring 382 and force transmitter 340 or retainer 330 is rotated at a high rate of rotation and surface 388 of lower spring 382 is pressed against surface 338 of retainer 330. While the surfaces are pressed together the rate of relative rotation is reduced to zero at a time determined so that the parts are welded together and are in the desired relative positions.

Thirdly, upper spring 362 is joined to force transmitter 340 by friction welding. In the friction welding machine either the assembly of the previously assembled elements or upper spring 362 is rotated at a high rate of rotation and surface 374 of upper spring 362 is pressed against surface 354 of force transmitter 340. While the surfaces are pressed together the rate of relative rotation is reduced to zero at a time determined so that the parts are welded together in the desired relative positions. While surfaces 354 and 374 are being welded together there is no contact between surface 336 of retainer 330 and surface 368 of upper spring 362. A fixture may be provided to prevent contact between surface 336 and surface 368.

Fourthly, retainer 330 and upper spring 362 are positioned and joined at surfaces 336 and 368 by a welding process that is sufficiently rapid that the temper of upper spring 362 is lost only in the vicinity of the weld. Laser welding is believed to be the best process but arc and plasma welding equipment may also perform adequately. The preferred position is believed to be such that washer shaped bases 364 and 384 are simultaneously flat.

Alternately to the preceding third and fourth steps, surfaces 336 and 368 may be joined in the friction welding process of the third step by causing surfaces 336 and 368 to be welded, rather than preventing contact between the two surfaces as described in the third assembly step. If this is done the fourth assembly step is not required.

Finally, force sensor 310 is placed in the completed assembly of retainer 330, force transmitter 340, and springs 362 and 382 as illustrated in FIG. 13. Base 312 is placed so its threads 318 engage threads 339 of retainer 330. While the output of force sensor 310 is monitored base 312 is tightened until the output of force sensor 310 indicates springs 362 and 382 are applying a predetermined preload force to force sensor 310. When the predetermined force is obtained, base 312 is permanently locked to retainer 330 by any of many suitable means known to those skilled in manufacturing. A small amount of adhesive applied to the threads would be one known means for locking. Welding or indenting threads are also known means for keeping threaded fastenings from loosening with time.

Since surfaces 354 and 374 are compressed together by the force of spring 362, welding is not required for normal operation of load cell 300 and it may be tempting to omit the welding. However, the result of omitting the welding is to allow surfaces 354 and 374 to separate under radial stresses or stresses tending to cause axial misalignment which may not be desired during operation of a vehicle.

The materials and methods and methods referred to hereinabove are only suggestions and other materials and methods may be substituted by those skilled in the relevant arts.

The operation of the load cell 300 will now be described with particular reference to FIG. 13.

When force is applied to load cell 300 force applicator 344 of force transmitter 340 applies that force plus the preload force of springs 362 and 382 to force sensor 310 thereby further pressuring liquid 198. The increase in pressure in liquid 198 is proportional to the force applied to force sensor 310. Therefore, the electrical signal from pressure sensor 230 indicates the force applied to load cell 300.

When a seat (not illustrated) is occupied, force from the weight of the seat and the occupant is received through seat frame member 214' and flange 218'. Flange 218' transmits the force it receives to the ledge 352 of force transmitter 340 which transmits the force to the insulating feedthrough 244, neck 328 and shoulder 326 of force sensor 310. When the force on force sensor 310 increases the distance from base 322 to shoulder 326 of bottle 320 decreases slightly because of the very slight compression of liquid 198 and because the bellows shaped sides 324 change their shape slightly and expand slightly in the radial direction. The force applied to force sensor 310 causes pressure in liquid 198 which is sensed by pressure sensor 230 and communicated to a processing unit such as processing unit 36. The microprocessor of the processing unit may adjust the pressure for the actual atmospheric pressure and for the actual ambient temperature.

The processing unit multiplies the pressure by an effective area that is approximately the area of the base 322 of bottle 320 thereby converting the pressure to the force being received by force sensor 310 of load cell 300. The effective area used in converting pressure to force is Less Than the area of base 322 of bottle 320 because a fraction of the axial force the pressurized fluid 198 applies to the bellows 324 is applied by the bellows 324 to base 322 and shoulder 326 at their outer peripheries. The actual effective are to be used is determined by experiment using the actual bellows sided bottle.

The materials and methods referred to hereinabove are only suggestions and other materials and methods may be substituted by those skilled in the relevant arts.

Although the description of this invention has been given with reference to particular embodiments, it is not to be construed in a limiting sense. Many variations and modifications will now occur to those skilled in the art. For a definition of the invention reference is made to the appended claims.

What is claimed is:

1. A load cell having an axis defining a direction, and comprising:
    a force receiver and a base for receiving force applied to said load cell,
    a first spring and a second spring, and
    force sensing means adapted to respond to said force applied to said load cell by generating a force signal, and wherein:
    each said spring comprises: a first part linked with said base for movement therewith, a second part linked with said force receiver for movement therewith and a uniting part unitary with said first and second parts, each said uniting part comprises a portion that is coplanar with a plane perpendicular to said axis, and said planes are offset from each other, whereby said force signal indicates the axial component of said force applied to said load cell and is insensitive to components having directions perpendicular to said axis.

2. The invention as defined by claim 1, wherein:

said force sensing means comprises a force sensor adapted for receiving force from said base and said force receiver, and said force sensor produces a force sensor signal responsive to said received force, whereby said force sensor signal is said force signal.

3. The invention as defined by claim 1, wherein:

said force sensing means comprises:

means for converting said force applied to said load cell to pressure in a liquid, and pressure sensing means responsive to said pressure in said liquid by producing a pressure signal, whereby said pressure signal is said force signal.

4. The invention as defined by claim 3 wherein:

said means for converting said force applied to said load cell to pressure in a liquid comprises a bottle, and said bottle is sufficiently compressible that when said force is applied between said base and said force receiver in the direction of said axis, the preponderance of said force is resisted by pressure in said liquid and not by said bottle.

5. The invention as defined by claim 3, wherein said pressure sensing means comprises:

an atmospheric pressure sensor for measuring atmospheric pressure, an absolute pressure sensor for measuring absolute pressure in said liquid, and means for subtracting said atmospheric pressure from said absolute pressure to obtain a pressure difference, whereby said pressure signal is said pressure difference.

6. The invention as defined by claim 1 wherein:

a said spring has the shape of a slightly conical washer unitary with two cylindrical flanges and is rotationally symmetric about said axis.

7. The invention as defined by claim 1 wherein:

said first spring is unitary with a first inside cylindrical flange and a first outside cylindrical flange, and one of said first flanges is linked to said base for movement therewith and the other of said first flanges is linked to said force receiver for movement therewith, whereby:

said one of said first flanges is a said first part and said other of said first flanges is a said second part.

8. The invention as defined by claim 7 wherein:

said second spring is unitary with a second inside cylindrical flange and a second outside cylindrical flange, and one of said second flanges is affixed to said base for movement therewith and the other of said second flanges is affixed to said force receiver for movement therewith, whereby said one of said second flanges is a said first part and said other of said second flanges is said second part.

9. The invention as defined by claim 1 wherein said springs exert a spring force between said force receiver and said base in a first direction that causes said force signal to indicate a greater force than if said spring force were zero, whereby there is a negative direction such that said force applied to said load cell in said negative direction causes said force signal to indicate a lesser force than said force signal indicates when said force applied to said load cell is zero.

10. The invention as defined by claim 1 and including, processing means adapted to receive said force signal and to categorize the occupant of said seat according to said force signal.

11. The invention as defined by claim 1, and including:

occupant protection means for protecting an occupant of a seat, and wherein said occupant protection means includes a seat belt, processing means, and a seat belt tension sensor responsive to tension in said seat belt by indicating said belt tension to said processing means, and said processing means is adapted to be responsive to said seat belt tension when protecting said occupant.

12. The invention as defined by claim 11 wherein said tension sensor comprises a switch having an open state and a closed state, said switch being responsive to tension in said seat belt by being in one of said states at tensions in said seat belt below a predetermined tension and being in the other of said states at tensions in said seat belt greater than said predetermined tension.

13. The invention as defined by claim 12 wherein said processing means is adapted to deploy occupant protection means, and said processing means is adapted to not deploy said occupant protection means if said switch has been closed constantly for a period of time greater than ten seconds within the prior thirty seconds.

14. The invention as defined by claim 12 wherein:

said processing means is adapted to deploy occupant protection means, said processing means comprises means for determining if an occupant of said seat weighs under 160 pounds, and said processing means is adapted to not deploy said occupant protection means if said switch has been closed constantly for a period of time greater than ten seconds within the prior thirty seconds and said occupant weights under 160 pounds.

15. The invention as defined by claim 11 wherein said tension sensor comprises:

a pair of bowed elements adapted to receive tension from said seat belt and respond to said tension by becoming less bowed, and sensing means adapted for producing a signal responsive to the said bow of said elements, and wherein said signal responsive to the said bow being said tension signal.

16. The invention as defined by claim 15 comprising an extension, and wherein:

said bowed elements each comprise first ends fixed to said extension and second ends adapted for slidably engaging said extension, and said extension is adapted for receiving torque from said seat belt and applying said torque at said second ends.

17. The invention as defined by claim 11 wherein said tension sensor comprises:
- a pair of bowed elements adapted to receive tension from said seat belt and respond to said tension by moving closer to each other, and
- force sensing means adapted to produce a force signal indicating force applied to said force sensing means, and wherein:
- said force sensing means is adapted for impeding said moving closer by receiving force from said bowed elements, and
- said force signal is said tension signal.

18. The invention as defined by claim 17, and including an extension, and wherein:
- said bowed elements each comprise first ends fixed to said extension and second ends adapted for slidably engaging said extension, and
- said extension is adapted for receiving torque from said seat belt and applying said torque at said slidable engagement.

19. The invention as defined by claim 1 including
- attachment means for attaching said load cell to a structural member of a seat, and wherein
- said attachment means is adapted to prevent movement of said structural member relative to said load cell in a direction parallel to said axis and to permit limited movement of said structural member relative to said load cell perpendicular to said axis.

20. A seat occupant weight sensing system comprising a seat and a load cell, wherein:
- said seat is adapted for receiving force from an occupant of said seat and applying force derived from said received force to said load cell, and
- said load cell has an axis defining a direction, and said load cell comprises:
- a base,
- a force receiver,
- a first spring linked with said base and said force receiver,
- a second spring linked with said base and said force receiver,
- fluid in contact with said base, said force receiver, and a said spring; and
- a pressure sensor responsive to pressure in said fluid by generating a force signal, whereby
- said force signal indicates the component of said force applied to said load cell in the direction of said axis and is insensitive to said force applied at said load cell in directions perpendicular to said axis.

21. The invention as defined by claim 20, wherein said fluid has a larger coefficient of thermal expansion than the materials of which said base, force receiver, and springs are made, and
- said load cell is made of a design and of materials that compensate for said larger coefficient of thermal expansion, whereby
- the variation of said force signal with temperature is minimized.

22. A seat occupant weight sensing system comprising a seat and a load cell, said load cell comprising:
- first and second force input elements for receiving force resulting from application of weight to said seat,
- first and second springs, and
- force sensing means responsive to force received from said force input elements by generating a force signal, and wherein:
- said load cell has an axis defining a direction,
- each of said springs comprises: a first linking element linked with said first force input element for movement therewith, a second linking element linked with said second force input element for movement therewith, and a unifying element unitary with said first element and said second element,
- each said unifying element comprises a portion coplanar with a plane perpendicular to said axis, and
- said planes are offset from each other, whereby
- said force signal indicates the axial component of said force resulting from the weight of an occupant of said seat and is insensitive to directions perpendicular to said axis.

* * * * *